US007903501B2

(12) United States Patent
Fujisawa

(10) Patent No.: US 7,903,501 B2
(45) Date of Patent: Mar. 8, 2011

(54) RADIO-CONTROLLED TIMEPIECE AND CONTROL METHOD FOR A RADIO-CONTROLLED TIMEPIECE

(75) Inventor: Teruhiko Fujisawa, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 365 days.

(21) Appl. No.: 12/145,379

(22) Filed: Jun. 24, 2008

(65) Prior Publication Data

US 2009/0016171 A1 Jan. 15, 2009

(30) Foreign Application Priority Data

Jul. 10, 2007 (JP) ................................ 2007-181313
Feb. 22, 2008 (JP) ................................ 2008-041877

(51) Int. Cl.
*G04C 11/02* (2006.01)
*H04L 25/49* (2006.01)

(52) U.S. Cl. .......................................... 368/47; 375/317

(58) Field of Classification Search ............. 368/46-47; 375/317
See application file for complete search history.

(56) References Cited

U.S. PATENT DOCUMENTS

| | | | | |
|---|---|---|---|---|
| 4,151,485 A * | 4/1979 | LaFratta | ....................... | 331/1 A |
| 6,052,422 A * | 4/2000 | Lin | .............................. | 375/355 |
| 6,349,121 B1 * | 2/2002 | Anderson | .................... | 375/317 |
| 7,075,859 B2 | 7/2006 | Miyahara et al. | | |
| 7,263,151 B2 * | 8/2007 | Momtaz et al. | .............. | 375/371 |
| 7,474,239 B2 * | 1/2009 | Su et al. | ........................ | 341/120 |
| 2007/0115759 A1 * | 5/2007 | Sano | .............................. | 368/47 |
| 2008/0107210 A1 | 5/2008 | Haefner | | |

FOREIGN PATENT DOCUMENTS

| | | | |
|---|---|---|---|
| DE | 20 2004 015 783 | U1 | 12/2004 |
| DE | 10 2005 056 483 | B3 | 1/2007 |
| EP | 1 061 648 | A1 | 12/2000 |
| EP | 1 788 460 | A2 | 5/2007 |
| JP | 10274681 | | 10/1998 |
| JP | 2001-036591 | A | 2/2001 |
| JP | 2004-317490 | | 11/2004 |
| JP | 2006060849 | | 3/2006 |

* cited by examiner

*Primary Examiner* — renee luebke
*Assistant Examiner* — Sean Kayes

(57) ABSTRACT

A radio-controlled timepiece that receives a standard time signal containing a time code and adjusts the time based on the received standard time signal includes: a reception unit that receives the standard time signal; an analog/digital conversion unit that digitizes the received standard time signal based on a prescribed threshold value; a time counter that keeps time; a time code generator that generates a reference time code based on the time counted by the time counter; a duty evaluation unit that calculates the pulse duty cycle of the digital signal output from the A/D conversion unit, and determines if the received pulse duty cycle that is calculated matches the duty cycle of the reference time code generated by the time code generator; a level changing unit that changes the relative level of the threshold value to the reception signal if the duty evaluation unit determines that the received pulse duty cycle does not match the duty cycle of the reference time code; and a time code decoder that decodes the digital signal and demodulates the time code if the duty evaluation unit determines that the received pulse duty cycle matches the duty cycle of the reference time code.

12 Claims, 18 Drawing Sheets

BINARY 1 SIGNAL

BINARY 0 SIGNAL

P SIGNAL

BINARY 1 SIGNAL

BINARY 0 SIGNAL

P SIGNAL

RADIO-CONTROLLED TIMEPIECE AND CONTROL METHOD FOR A RADIO-CONTROLLED TIMEPIECE

CROSS-REFERENCE TO RELATED APPLICATIONS

Japanese Patent application No.(s) 2007-181313 and 2008-041877 are hereby incorporated by reference in their entirety.

BACKGROUND

1. Field of Invention

The present invention relates to a radio-controlled timepiece that receives a standard time signal containing time information and adjusts the time based on the received standard time signal, and to a control method for the radio-controlled timepiece.

2. Description of Related Art

Radio-controlled timepieces that can receive a standard time signal are known from the literature. See, for example, Japanese Unexamined Patent Appl. Pub. JP-A-H10-274681, and Japanese Unexamined Patent Appl. Pub. JP-A-2006-60849.

The standard time signal is an amplitude modulated signal, and the reception circuit of the radio-controlled timepiece has a filter or other unit of extracting the envelope of the received signal, and an analog/digital conversion circuit that compares the envelope signal with a reference voltage by unit of a comparator to digitize the envelope signal. The radio-controlled timepiece acquires time information and displays the time based on the time code signal obtained by the A/D conversion circuit.

The radio-controlled timepiece also typically has an automatic gain control (AGC) circuit to automatically control the amplification factor of the reception signal based on the reception signal.

While the radio-controlled timepiece has an AGC circuit, the threshold values used by the A/D conversion circuit for digitizing the signal are fixed, and the reception environment may therefore prevent acquiring the correct time code.

As a result, the radio-controlled timepiece receives the standard time signal continuously for three to seven minutes in order to acquire the time code multiple times, and then compares and evaluates the received time codes to determine if the correct time information was received.

This method therefore necessarily requires several minutes in order to determine if the correct time information was received. This unit that a relatively long time is required to determine that the correct time information cannot be acquired if the reception environment is poor, and power consumption increases accordingly

SUMMARY OF INVENTION

The radio-controlled timepiece and the control method for a radio-controlled timepiece according to the present invention reduce the effect of the reception environment and reduce power consumption when acquiring time information.

A first aspect of the invention is a radio-controlled timepiece that receives a standard time signal containing a time code and adjusts the time based on the received standard time signal, the radio-controlled timepiece including: a reception unit that receives the standard time signal; an analog/digital conversion unit that digitizes the received standard time signal based on a prescribed threshold value; a time counter that keeps time; a time code generator that generates a reference time code based on the time counted by the time counter; a duty evaluation unit that calculates the pulse duty cycle of the digital signal output from the A/D conversion unit, and determines if the received pulse duty cycle that is calculated matches the duty cycle of the reference time code generated by the time code generator; a level changing unit that changes the relative level of the threshold value to the reception signal if the duty evaluation unit determines that the received pulse duty cycle does not match the duty cycle of the reference time code; and a time code decoder that decodes the digital signal and demodulates the time code if the duty evaluation unit determines that the received pulse duty cycle matches the duty cycle of the reference time code.

The time code generator in this aspect of the invention generates a reference time code based on the time counted by the time counter. The duty evaluation unit then compares the duty cycle of the generated reference time code with the received pulse duty cycle of the digital signal digitized from the standard time signal received by the reception unit. The level changing unit controls changing the relative level of the threshold value to the reception signal by, for example, changing the amplification factor applied to the control signal or the threshold value used to digitize the reception signal if the received pulse duty cycle does not match the duty cycle of the reference time code. The A/D conversion conditions of the A/D conversion unit are thus optimized so that the received pulse duty cycle matches the duty cycle of the reference time code.

The precision of a quartz timepiece is typically within one second per day, and when a radio-controlled timepiece adjusts the time when the standard time signal is received at a preset time each day, very little if any adjustment is actually required. Based on the novel discovery that the time code based on the time kept by an internal time counter normally matches the time code of the received standard time signal, the present invention evaluates the received time signal based on the duty cycle of this time code.

For example, the time code of the JJY standard time signal broadcast in Japan expresses the time and the date using different sequences of binary 0, binary 1, and position marker P signals, and the duty cycle of the time code is determined according to the time that the signal is transmitted. Therefore, by first generating the reference time code based on the time kept by the internal time counter, the pulse duty of the reception signal should match the duty cycle of the reference time code if the radio-controlled timepiece is set to receive the JJY signal. It can therefore be known that the level of the reception signal has dropped due to the effect of the ambient reception environment of the radio-controlled timepiece if the received pulse duty cycle does not match the duty cycle of the reference time code, the level of the threshold value relative to the reception signal can be changed and optimized, and the correct time code can be acquired.

Changing the relative level of the threshold value is possible by acquiring the time code for only one minute, for example, and processing time can therefore be shortened compared with prior art control methods that cannot make a decision without receiving the time signal for plural minutes. The overall reception time can therefore be shortened and power consumption can be reduced.

Furthermore, the threshold value level can be adjusted to match the reception signal by changing the relative level of the threshold value and the correct time code can thus be acquired even if the reception environment is somewhat poor.

The time code duty cycle as used herein unit the ratio of the high signal level within a specific range of signals in the time code. For example, to determine the duty cycle in one minute of time code data, the total time of HIGH level signals within the one minute of data is divided by one minute (=60 seconds) and expressed as a percentage to acquire the duty cycle.

The relative level of the threshold value to the reception signal unit the relative level of the threshold voltage to the amplitude (voltage) of the reception signal. More specifically, the reception signal oscillates between HIGH and LOW levels, and the threshold value is set between these extremes. In this case the threshold value can be set relative to the peak level of the reception signal.

A match as used herein includes a small range of tolerance for error. For example, if the duty cycle of the reference time code and the received pulse duty cycle differ by no more than 1% to 3%, the duty cycle of the reference time code and the received pulse duty cycle are determined to match. More specifically, the standard time signal is a pulse signal that transmits one pulse per second, encodes binary 0, binary 1, and position marker signals using differences in the length of the time a pulse is high (the duty cycle), and transmits the time code by arranging the transmitted pulses in a specific sequence. The duty cycles of the 1-Hz pulse signals encoded in the JJY signal, for example, are 20% for a position marker P signal, 50% for a binary 1, and 80% for a binary 0. While the duty cycle of one time code (a time code lasting one minute) varies according to the time encoded in the time code, error is within approximately 1-3% unless the current time and date kept by the time counter deviate greatly. Therefore, if the received pulse duty cycle and the duty cycle of the reference time code substantially match when the JJY signal is received, the threshold value level is determined to be optimized and the correct time code can be received.

The received pulse duty cycle and the duty cycle of the reference time code can be calculated from a 1-minute time code, or from a segment of the 1-minute time code. If, for example, the duty cycle of the hour portion of the time code is calculated and compared, whether the duty cycles completely match or not can be determined because the internal time of the radio-controlled timepiece (the count of the time counter) rarely deviates by an hour or more from the time of the standard time signal.

In a radio-controlled timepiece according to another aspect of the invention, the duty evaluation unit determines if the received pulse duty cycle is greater than or less than the duty cycle of the reference time code if the received pulse duty cycle does not match the duty cycle of the reference time code, and the level changing unit increases the level of the threshold value relative to the reception signal if the received pulse duty cycle is greater than the duty cycle of the reference time code, and decreases the level of the threshold value relative to the reception signal if the received pulse duty cycle is less than the duty cycle of the reference time code.

If the received pulse duty cycle is greater than the duty cycle of the reference time code, the threshold value level is low relative to the level of the reception signal, and a signal that should be converted as a LOW level signal may be determined to be HIGH. Conversely, if the received pulse duty cycle is less than the duty cycle of the reference time code, the threshold value level is high relative to the level of the reception signal, and a signal that should be converted as a HIGH level signal may be determined to be LOW.

The relative level of the threshold value can therefore be desirably adjusted in a short time by increasing the relative level of the threshold value to the reception signal when the received pulse duty cycle is greater than the duty cycle of the reference time code, and decreasing the relative level of the threshold value to the reception signal when the received pulse duty cycle is less than the duty cycle of the reference time code.

The radio-controlled timepiece according to another aspect of the invention also has a threshold value adjustment unit that changes the threshold value of the A/D conversion unit. The level changing unit outputs a control signal to change the threshold value of the A/D conversion unit to the threshold value adjustment unit if the duty evaluation unit determines the received pulse duty cycle does not match the duty cycle of the reference time code, and the threshold value adjustment unit changes the threshold value level and changes the level of the threshold value relative to the reception signal according to the control signal.

Because the level changing unit in this aspect of the invention changes the threshold value used by the A/D conversion unit, the level of the threshold value relative to the reception signal can be changed even while the signal amplification factor remains constant, and the correct time code can be acquired.

For example, if the signal pulse duty is greater than the duty cycle of the reference time code, the threshold value level is low relative to the level of the reception signal, noise in the LOW level part of the reception signal may be greater than the threshold value, and a signal that should be converted as a LOW level signal may be determined to be HIGH. By increasing the threshold value in this case noise in the LOW level part of the signal will go below the threshold level, and the correct time code can be acquired.

Conversely, if the signal pulse duty cycle is less than the duty cycle of the reference time code, the threshold value level is high relative to the level of the reception signal, the HIGH level part of the reception signal may be below the threshold level, and a signal that should be converted as a HIGH level signal may be determined to be LOW. By decreasing the threshold value in this case the HIGH level part of the signal will go to or above the threshold level, and the correct time code can be acquired.

If the A/D conversion unit includes a comparator, the threshold value level can be changed by changing the level of the reference voltage input to the comparator, for example. The threshold value can therefore be changed by a simple control method, and a relatively simple circuit design can be used.

The threshold value can be rendered to change continuously, but is normally preferably selectable from among plural levels (such as 3 to 4 levels).

The radio-controlled timepiece according to another aspect of the invention also has an amplification unit that amplifies the received standard time signal, and an amplification adjustment unit that changes the reception signal amplification factor of the amplification unit. The level changing unit outputs a control signal to change the signal amplification factor of the amplification unit to the amplification adjustment unit if the duty evaluation unit determines the received pulse duty cycle does not match the duty cycle of the reference time code, and the amplification adjustment unit changes the signal amplification factor of the amplification unit and changes the level of the threshold value relative to the reception signal according to the control signal.

Because the level changing unit in this aspect of the invention changes the signal amplification factor, the level of the threshold value relative to the reception signal can be changed even while the threshold value remains constant, and the correct time code can be acquired.

For example, if the signal pulse duty is greater than the duty cycle of the reference time code, noise in the LOW level part of the reception signal may be amplified above the threshold level, and a signal that should be converted as a LOW level signal may be determined to be HIGH. By decreasing the signal amplification factor in this case, noise in the LOW level part of the signal will go below the threshold level, and the correct time code can be acquire Conversely, if the signal pulse duty cycle is less than the duty cycle of the reference time code, the HIGH level part of the reception signal may be below the threshold level, and a signal that should be converted as a HIGH level signal may be determined to be LOW. By increasing the signal amplification factor in this case the HIGH level part of the signal will go to or above the threshold level, and the correct time code can be acquired.

Furthermore, because the level changing unit changes the signal amplification factor of the amplification unit, the AGC characteristic of the AGC circuit can be changed to control the amplification factor of the amplification unit if an AGC circuit is used as the amplification adjustment unit. Because a radio-controlled timepiece usually already has an AGC circuit, it is not necessary to incorporate any new parts in order to change the signal amplification factor and change the relative level of the threshold value, and this aspect of the invention can therefore be achieved at a low cost.

The radio-controlled timepiece according to another aspect of the invention preferably also has a reception circuit unit including the reception unit, the A/D conversion unit, and the threshold value adjustment unit, and a control circuit unit including the time counter, the time code generator, the duty evaluation unit, the time code decoder, and the level changing unit, and controlling the standard time signal reception state of the reception circuit unit by outputting the control signal output from the level changing unit to the reception circuit unit. The reception circuit unit includes a control signal decoding unit that decodes the control signal output from the level changing unit of the control circuit unit, and outputs the decoded control signal to the threshold value adjustment unit.

In this aspect of the invention the decoding unit decodes the input control signal, and the threshold value adjustment unit adjusts the threshold value of the A/D conversion unit based on the decoded control signal. Because the decoding unit thus decodes the control signal, the control signal output from the control circuit unit can be set to a simple signal, and the reliability of the output signal can be improved.

The radio-controlled timepiece according to another aspect of the invention preferably also has a reception circuit unit including the amplification unit, the amplification adjustment unit, and the A/D conversion unit, and a control circuit unit. The control circuit unit includes the time counter, the time code generator, the duty evaluation unit, the time code decoder, and the level changing unit, and controls the standard time signal reception state of the reception circuit unit by outputting the control signal output from the level changing unit to the reception circuit unit. The reception circuit unit comprises a control signal decoding unit that decodes the control signal output from the level changing unit of the control circuit unit, and outputs the decoded control signal to the amplification adjustment unit.

In this aspect of the invention the decoding unit decodes the input control signal, and the amplification adjustment unit adjusts the amplification factor of the amplification unit based on the decoded control signal. Because the decoding unit thus decodes the control signal, the control signal output from the control circuit unit can be set to a simple signal, and the reliability of the output signal can be improved.

The radio-controlled timepiece according to another aspect of the invention also has a serial communication bus that connects the reception circuit unit and the control circuit unit. The control circuit unit serially outputs the control signal to the reception circuit unit through the serial communication bus, and the reception circuit unit serially receives the control signal through the serial communication line and decodes the received control signal by unit of the control signal decoding unit.

The reception circuit unit and the control circuit unit are thus connected by a serial connection. This method enables reducing the number of signal lines compared with using a parallel connection to connect the reception circuit unit and the control circuit unit, and thus enables further simplifying the circuit design of the radio-controlled timepiece.

Furthermore, while achieving high speed communication is difficult with a parallel connection because of the need to synchronize data communication on each signal line, this invention enables high speed communication and suppresses signal transmission errors by serially outputting the control signal, improves response when adjusting the signal amplification factor by unit of the amplification adjustment unit and when adjusting the voltage by unit of the voltage adjustment unit, and improves reliability.

In a radio-controlled timepiece according to another aspect of the invention the level changing unit does not change the threshold value and holds the level of the threshold value relative to the reception signal constant until the reception operation ends after the duty evaluation unit determines after the reception operation starts that the received pulse duty cycle matches the duty cycle of the reference time code.

After setting the level of the threshold value relative to the reception signal to an appropriate level, this aspect of the invention fixes the threshold level and holds the threshold level constant while the time code decoder decodes the time code.

The A/D conversion process is therefore stable, bit error can be prevented, and the time code can be more accurately decoded.

In a radio-controlled timepiece according to another aspect of the invention the level changing unit stores the relative level of the threshold value to the reception signal that is set during the reception operation for each type of standard time signal received, and sets the stored level of the threshold value relative to the reception signal as the initial value used when the time signal is next received.

A radio-controlled timepiece generally has a function for automatically receiving the standard time signal at a preset time. The reception environment is also typically substantially the same at this preset reception time. Therefore, by setting the relative level of the threshold value to the reception signal that was set and stored when the time signal was last received as the initial setting used to receive the signal, the likelihood is high that the received pulse duty cycle will match the duty cycle of the reference time code without needing to change the threshold level. The reception process can therefore be completed efficiently in a shorter time.

In a radio-controlled timepiece according to another aspect of the invention the reception unit can selectively receive a plurality of standard time signal types, and the radio-controlled timepiece also has a reception signal setting unit that selects the type of standard time signal received by the reception unit. The time code generator generates a time code corresponding to the type of standard time signal selected by the reception signal setting unit, and the duty evaluation unit compares and evaluates the duty cycle of the reference time code corresponding to the type of standard time signal selected by the reception signal setting unit with the received pulse duty cycle of the digitized signal.

The duty cycle of the reference time code can therefore be set according to the type of standard time signal selected for reception in a radio-controlled timepiece that can receive a plurality of types of standard time signals, such as the JJY signal used in Japan, the WWVB signal in the United States, and the DCF77 signal in Germany. The optimum level can therefore be set according to the standard time signal, and the correct time code can be acquired.

The radio-controlled timepiece according to another aspect of the invention also has an internal time reliability determination unit that determines the reliability of the time kept by the time counter. The time code generator generates the reference time code when the time counted by the time counter is determined reliable by the internal time reliability determination unit.

The internal time reliability determination unit determines if the internal time, which is the time kept by the time counter, and the actual time match to a defined degree, and thus determines the reliability of the internal time. The internal time reliability determination unit determines that the reliability of the internal time is low using the following conditions for evaluating the reliability of the internal time. More specifically, the reliability of the internal time is determined to be low (1) when the standard time signal has not be successfully received even once after the internal time has been reset, (2) when at least a prescribed time (such as one week) has passed since the last time the standard time signal was successfully received; and (3) when the time was adjusted manually by the user.

If the internal time differs greatly from the current time, the duty cycle of the reference time code based on this internal time will differ from the duty cycle of the time code based on the actual time. As a result, if the level changing unit changes the relative level of the threshold value to the reception signal to a level determined by the duty cycle of this reference time code, it may not be possible to acquire the correct time code from the received standard time signal. Therefore, if the internal time reliability determination unit determines that the reliability of the internal time is low, the time code generator does not generate the reference time code. A reference time code that is wrong because the internal time is incorrect will therefore not be output, and the threshold level of the reception signal is set based on the reference time code only when the reliability of the internal time is high. A time code that is more highly reliable can therefore be acquired, and the time can be adjusted more accurately.

Another aspect of the invention is a control method for a radio-controlled timepiece that receives a standard time signal containing a time code and adjusts the time based on the received standard time signal, the control method including steps of: receiving the standard time signal; digitizing and outputting the received standard time signal based on a prescribed threshold value; generating a reference time code based on a time counted by a time counter; calculating the pulse duty cycle of the digital signal, and determining if the calculated pulse duty of the digital signal matches the duty cycle of the generated reference time code; changing the relative level of the threshold value to the reception signal if the received pulse duty cycle does not match the duty cycle of the reference time code, and repeating this level changing step until the received pulse duty cycle matches the duty cycle of the reference time code; and decoding the digital signal and demodulating the time code when the received pulse duty cycle matches the duty cycle of the reference time code.

Like the radio-controlled timepiece according to the present invention, this aspect of the invention can shorten the total reception time and reduce power consumption, and can adjust the threshold level appropriately to the reception signal, acquire the correct time code, reduce the effects of the reception environment, and set the time to the correct time even when the reception environment is somewhat poor.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Embodiment 1

A radio-controlled timepiece 1 according to a first preferred embodiment of the invention is described next with reference to the accompanying figures.

Figure 1:
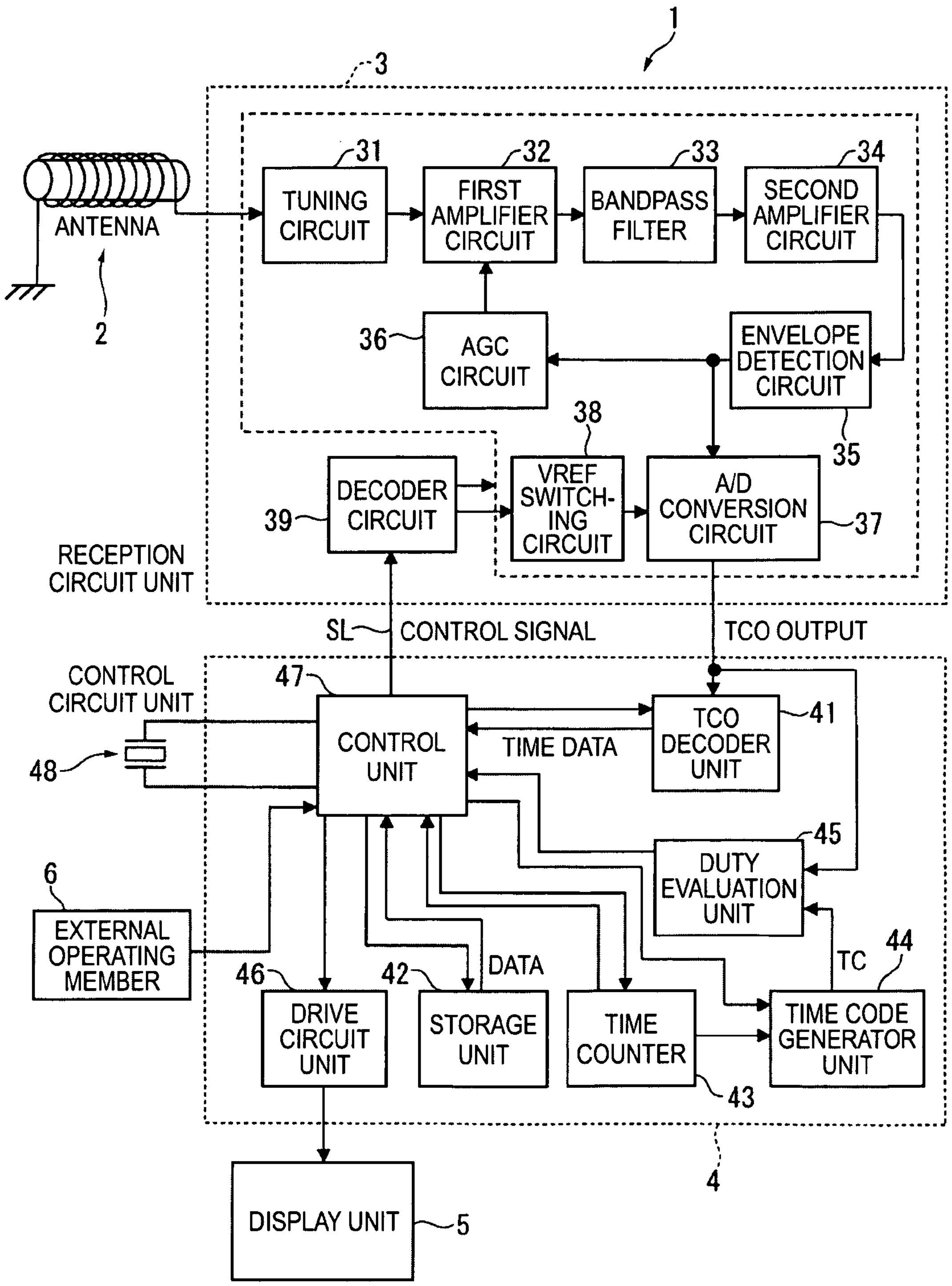
FIG. 1 is a block diagram showing the configuration of a radio-controlled timepiece according to a first embodiment of the invention.

FIG. 1 is a block diagram showing the configuration of a radio-controlled timepiece according to this first embodiment of the invention.

Figure 2:
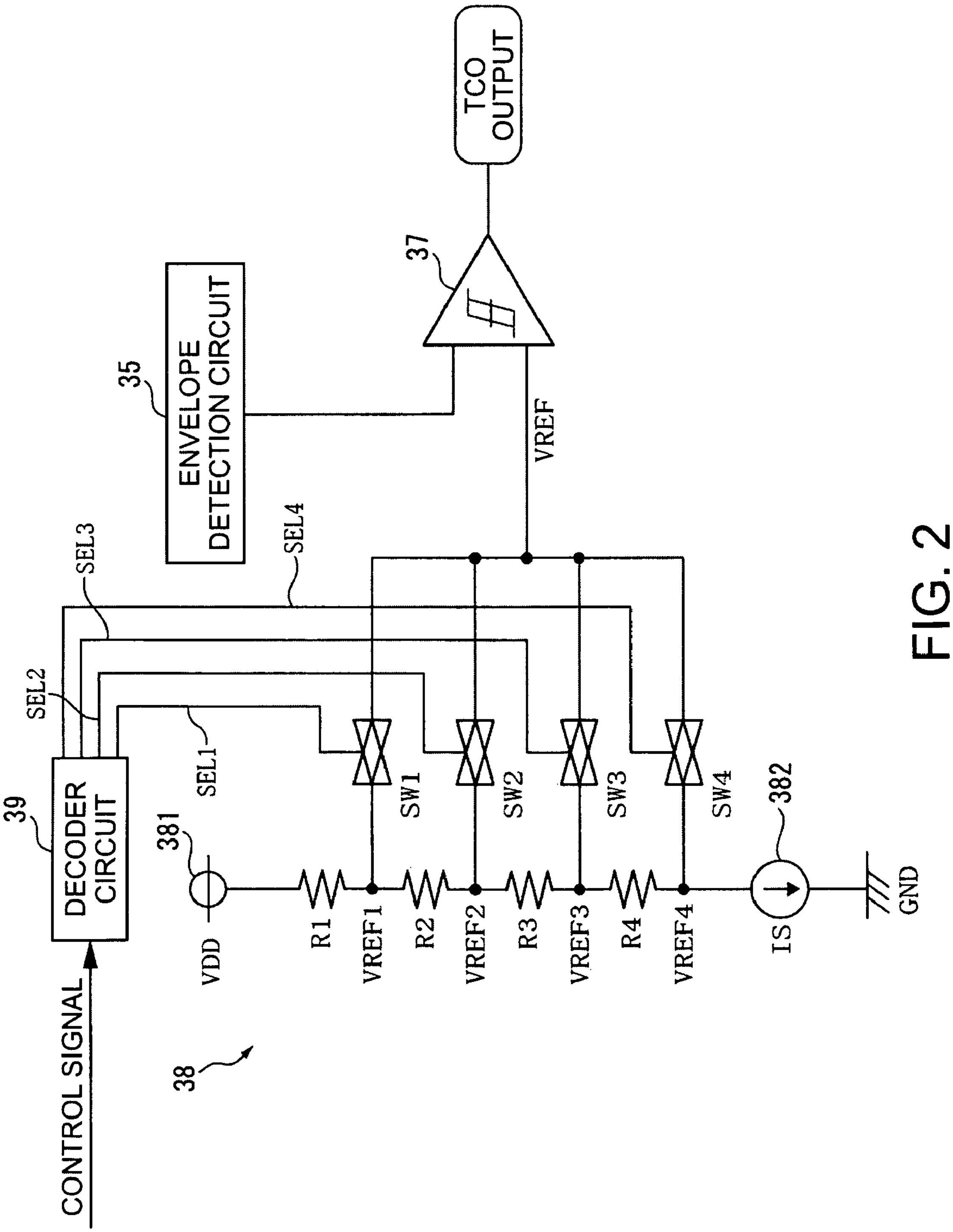
FIG. 2 is a circuit diagram of the analog/digital (A/D) conversion circuit and VREF switching circuit in the first embodiment of the invention.

FIG. 2 is a circuit diagram of the analog/digital (A/D) conversion circuit and VREF switching circuit.

Figure 3A:
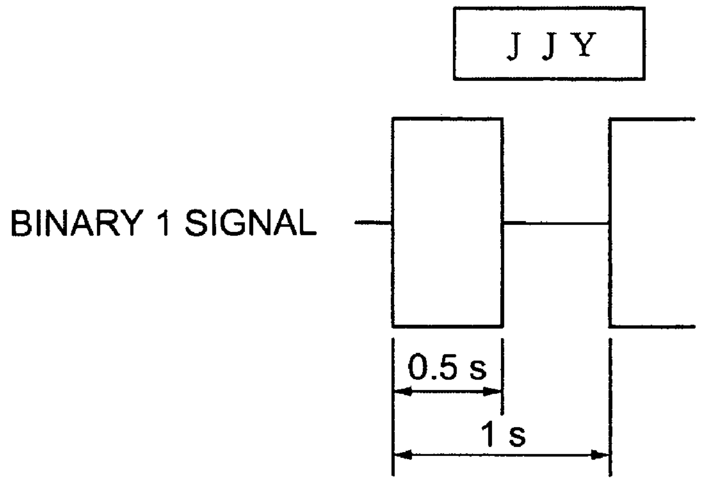
FIGS. 3A, 3B, and 3C show the duty cycle of the received pulses and the amplitude change in the signals transmitted as part of the JJY standard time signal that is broadcast in Japan.
Figure 3B:
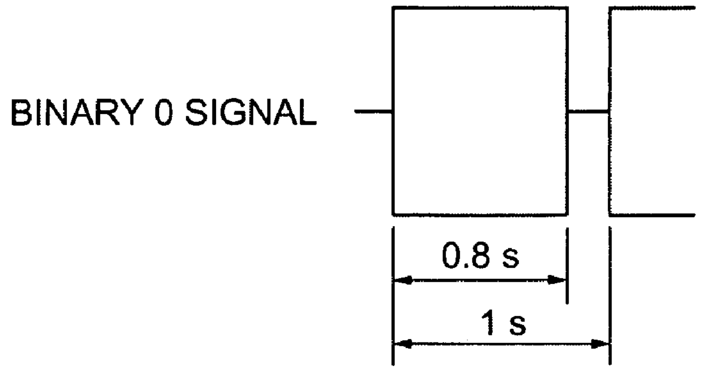
Figure 3C:
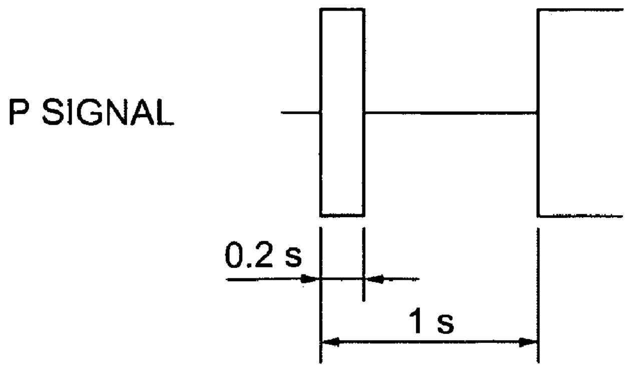

FIG. 3 shows the duty cycle of the received pulses and the amplitude change in the signals transmitted as part of the JJY standard time signal that is broadcast in Japan.

Figure 4A:
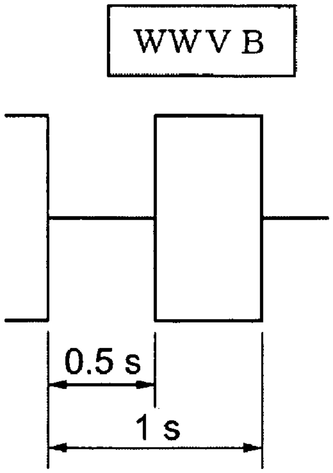
FIGS. 4A, 4B, and 4C show the received pulse duty cycle and the amplitude change in the signals transmitted as part of the WWVB standard time signal that is broadcast in the United States.
Figure 4B:
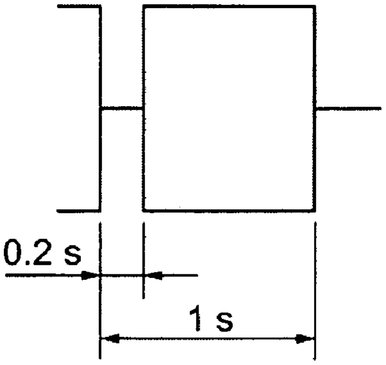
Figure 4C:
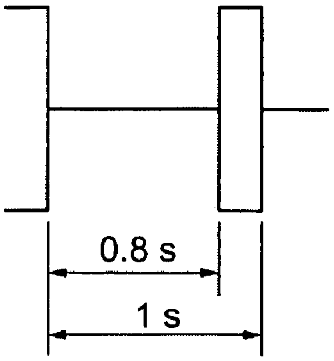

FIG. 4 shows the received pulse duty cycle and the amplitude change in the signals transmitted as part of the WWVB standard time signal that is broadcast in the United States.

Figure 5A:
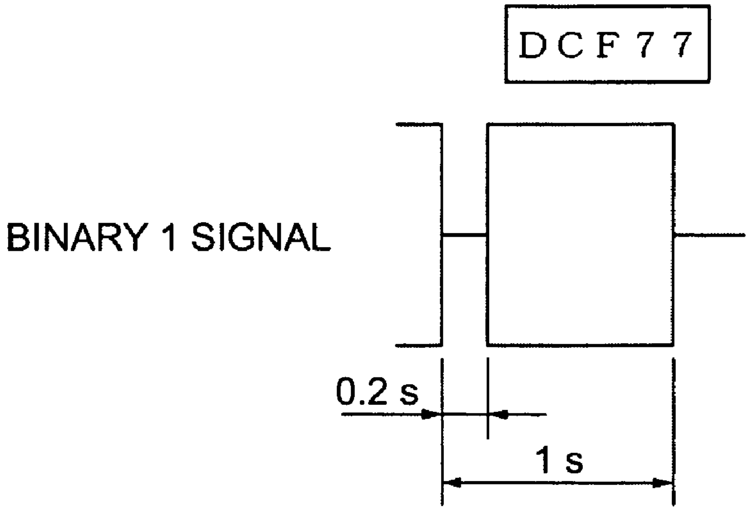
FIGS. 5A and 5B show the received pulse duty cycle and the amplitude change in the signals transmitted as part of the DCF77 standard time signal that is broadcast in Germany.
Figure 5B:
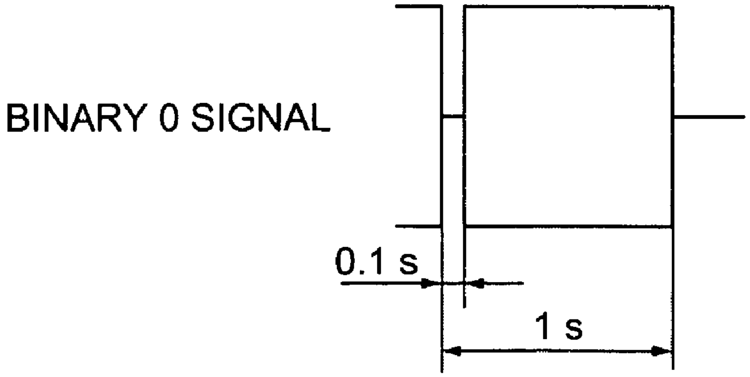

FIG. 5 shows the received pulse duty cycle and the amplitude change in the signals transmitted as part of the DCF77 standard time signal that is broadcast in Germany.

Figure 6A:
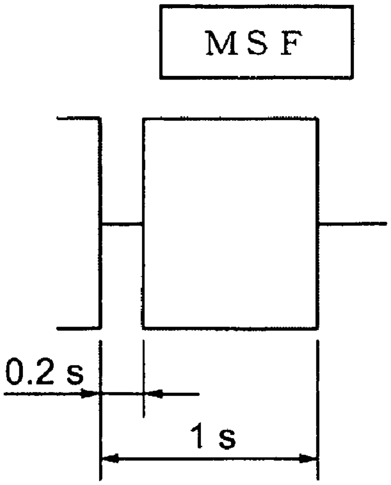
FIGS. 6A, 6B, and 6C show the received pulse duty cycle and the amplitude change in the signals transmitted as part of the MSF standard time signal that is broadcast in Great Britain.
Figure 6B:
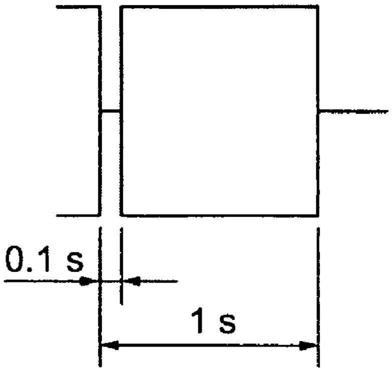
Figure 6C:
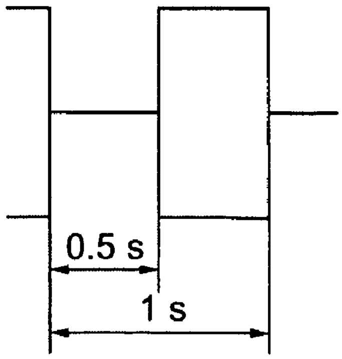

FIG. 6 shows the received pulse duty cycle and the amplitude change in the signals transmitted as part of the MSF standard time signal that is broadcast in Great Britain.

Figure 7:
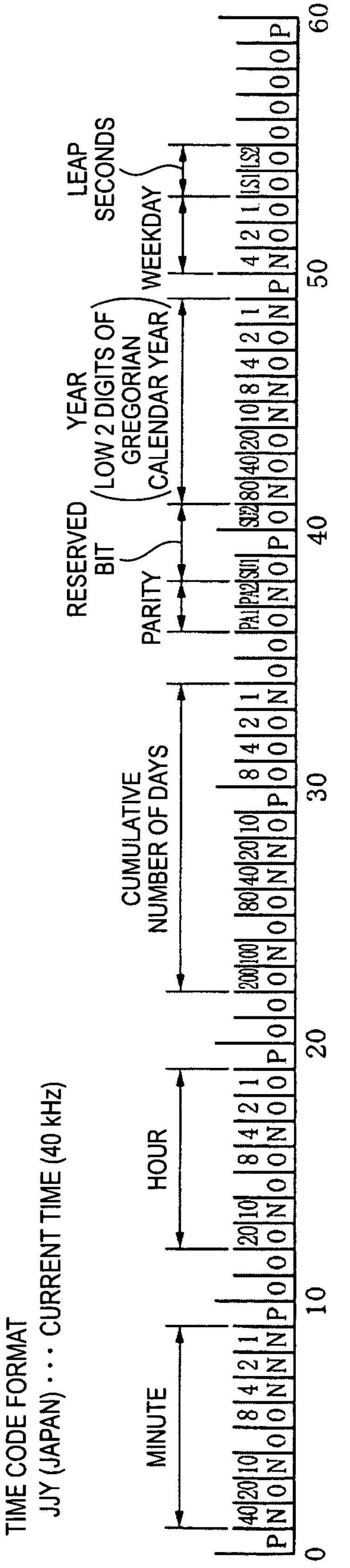
FIG. 7 shows the time code format of the JJY standard time signal in Japan.

FIG. 7 describes the time code format of the JJY standard time signal in Japan.

Figure 8:
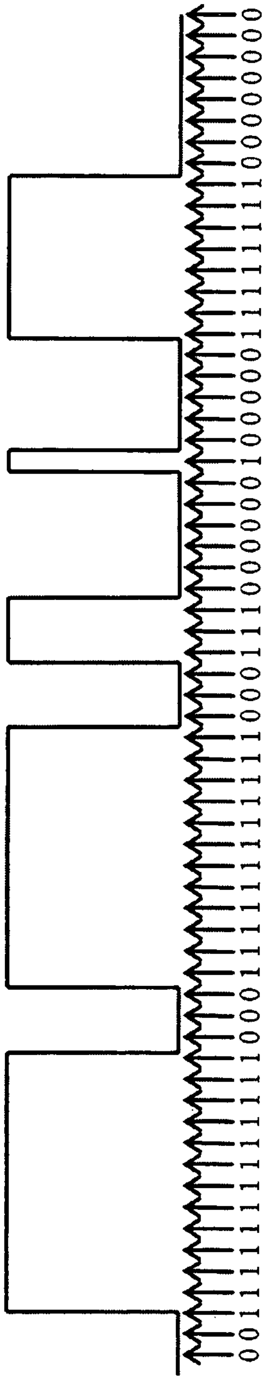
FIG. 8 shows a method of measuring the pulse duty of the TCO signal in the duty evaluation unit.

FIG. 8 describes a method of measuring the pulse duty of the TCO signal in the duty evaluation unit.

Figure 9:
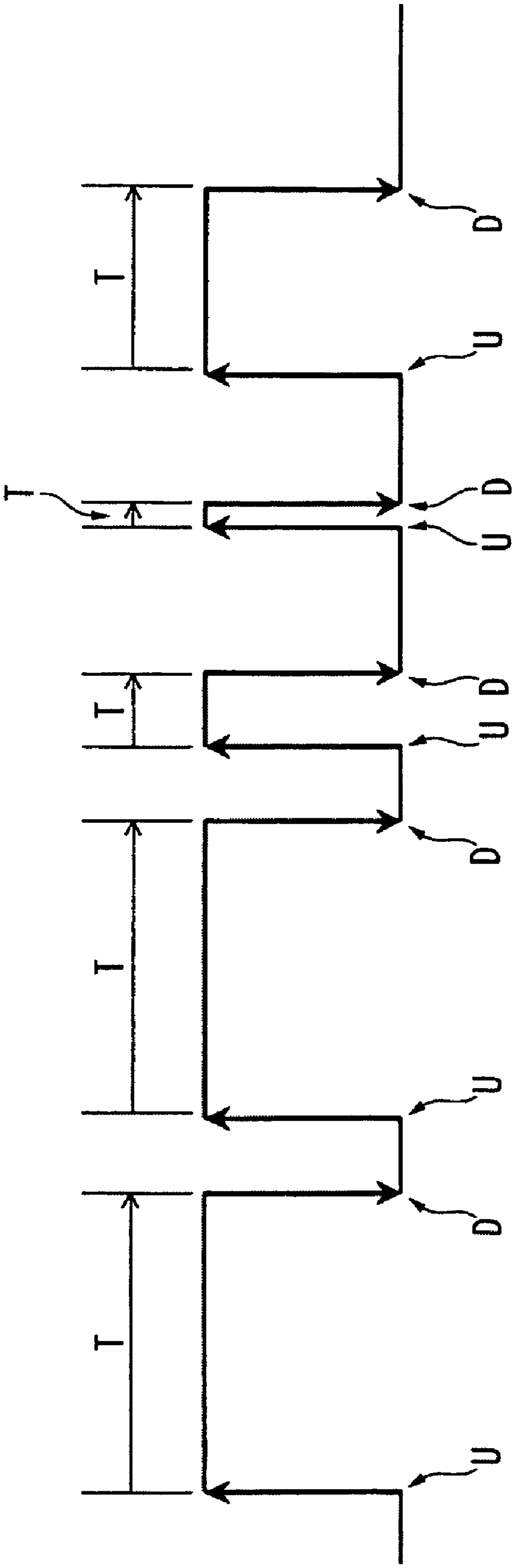
FIG. 9 shows another method of measuring the pulse duty of the TCO signal in the duty evaluation unit.

FIG. 9 describes another method of measuring the pulse duty of the TCO signal in the duty evaluation unit.

(1) Configuration of the Radio-Controlled Timepiece 1

As shown in FIG. 1 the radio-controlled timepiece 1 has an antenna 2 as a reception unit, a reception circuit unit 3, a control circuit unit 4, a display unit 5, an external operating member 6 as a reception signal setting unit, and a crystal oscillator 48.

The antenna 2 receives a long-wave standard time signal (simply "standard time signal" below) and passes the received standard time signal to the reception circuit unit 3.

The reception circuit unit 3 demodulates the standard time signal received by the antenna 2, and outputs the resulting TCO (time code out) signal to the control circuit unit 4. The reception circuit unit 3 is described in detail further below.

The control circuit unit 4 decodes the input TCO, generates the time code (TC) signal, and sets the time of the time counter 43 based on the time code signal. The control circuit unit 4 also controls displaying the time kept by the time counter 43 on the display unit 5. The control circuit unit 4 also evaluates the duty of the TCO input from the reception circuit unit 3, and outputs a control signal to the reception circuit unit 3. The control circuit unit 4 is described in detail further below.

Driving the display unit 5 is controlled by the drive circuit unit 46 of the control circuit unit 4 to display the time counted by the time counter 43. The display unit 5 could have a liquid crystal display panel and display the time on the LCD panel, or it could be an analog movement with a dial and hands that are moved as controlled by the control circuit unit 4.

The external operating member 6 is typically a crown or push button that is operated by the user and outputs a prescribed operating signal to the control circuit unit 4. Examples of such operating signals include signal type selection data that sets the type of standard time signal received by the antenna 2 (specifying, for example, whether the received signal is the JJY signal transmitted in Japan, the WWVB signal transmitted in the United States, or the DCF77 signal transmitted in Germany), and a reset time command causing the standard time signal to be received and the time set.

The crystal oscillator 48 outputs a prescribed reference signal (a reference clock, such as a 1-Hz signal). The reference signal output by the crystal oscillator 48 is input to the control circuit unit 4.

(2) Configuration of the Reception Circuit Unit 3

As shown in FIG. 1, the reception circuit unit 3 has a tuning circuit 31, a first amplifier circuit 32 as an amplification unit, a bandpass filter 33, a second amplifier circuit 34, a envelope detection circuit 35, an AGC (automatic gain control) circuit 36 as an amplification adjustment unit, an A/D conversion circuit 37 as a digitizing unit, a VREF switching circuit 38 as a threshold value adjustment unit, and a decoder circuit 39 as a control signal decoding unit.

The tuning circuit 31 has a capacitor, and the tuning circuit 31 and antenna 2 together render a parallel resonance circuit. The tuning circuit 31 causes the antenna 2 to receive signals of a particular frequency. The tuning circuit 31 converts the standard time signal received by the antenna 2 to a voltage signal, and outputs to the first amplifier circuit 32. The reception circuit unit 3 in this aspect of the invention can receive standard time signals transmitted in different formats, including the Japanese JJY signal, the WWVB signal in the United States, the DCF77 signal transmitted in Germany, and the MSF signal transmitted in Great Britain.

The first amplifier circuit 32 adjusts the gain according to the signal input from the AGC circuit 36 described below, and amplifies the reception signal input from the tuning circuit 31 by a constant amount for input to the bandpass filter 33. More specifically, the first amplifier circuit 32 reduces the gain when the amplitude of the signal input from the AGC circuit 36 is high and increases the gain when the amplitude is low so that the reception signal is amplified to a constant output amplitude.

The bandpass filter 33 is a filter that extracts a signal of a desired frequency band. More specifically, passing the signal through the bandpass filter 33 removes everything but the carrier component from the reception signal input from the first amplifier circuit 32.

The second amplifier circuit 34 then amplifies the reception signal input from the bandpass filter 33 by a fixed gain rate.

The envelope detection circuit 35 has a rectifier not shown and a low-pass filter (LPF) not shown, rectifies and filters the reception signal input from the second amplifier circuit 34, and outputs the filtered envelope signal to the AGC circuit 36 and A/D conversion circuit 37.

The AGC circuit 36 outputs a signal that determines the gain used by the first amplifier circuit 32 when amplifying the reception signal based on the reception signal input from the envelope detection circuit 35.

As shown in FIG. 2, the A/D conversion circuit 37 is a binary comparator with two inputs, one connected to the envelope detection circuit 35 and the other connected to the VREF switching circuit 38. The A/D conversion circuit 37 outputs a digital TCO signal based on the envelope signal input form the envelope detection circuit 35 and the reference voltage (threshold value) of a prescribed voltage input from the VREF switching circuit 38.

More specifically, the A/D conversion circuit 37 outputs a signal with a HIGH level voltage when the voltage of the envelope signal is greater than the reference voltage, and outputs a LOW level signal with a voltage that is below the HIGH level voltage when the voltage of the envelope signal is less than the reference voltage, as the TCO signal output to the TCO decoder unit 41 of the control circuit unit 4. It will also be obvious that a LOW level signal could be output as the TCO signal to the TCO decoder unit 41 of the control circuit unit 4 when the envelope signal voltage is greater than the reference voltage, and a HIGH level signal could be output as the TCO signal when the envelope signal voltage is less than the reference voltage.

The VREF switching circuit 38 generates reference voltages VREF1 to VREF4 from the supply voltage VDD output from the constant voltage supply 381, and outputs the reference voltage to the A/D conversion circuit 37. The VREF switching circuit 38 includes the constant voltage supply 381, four resistances R1 to R4 disposed between the constant voltage supply 381 and ground GND, four switches SW1 to SW4 disposed between the four resistances R1 to R4, and between resistance R3 and ground GND, and the A/D conversion circuit 37, and a constant current supply 382 disposed between the resistance R4 and ground GND.

The switches SW1 to SW4 are analog switches, switch SW1 being connected between resistances R1, R2 and the A/D conversion circuit 37, switch SW2 connected between resistances R2, R3 and the A/D conversion circuit 37, switch SW3 connected between resistances R3, R4 and the A/D conversion circuit 37, and switch SW4 connected between resistance R4 and the constant current supply 382 and between the resistance R4 and the A/D conversion circuit 37. Each of the switches SW1 to SW4 is independently connected to the decoder circuit 39 through intervening selection lines SEL1 to SEL4, and switch on and off according to the signals input from the decoder circuit 39. By turning one of the switches SW1 to SW4 on (conductive) and turning the other switches off (non-conductive), the supply voltage VDD output from the constant voltage supply 381 is voltage adjusted by the current IS output from the constant current supply 382 and the resistance R, and is input as the reference voltage VREF to the A/D conversion circuit 37.

The VREF switching circuit 38 outputs reference voltage VREF1, which is the highest reference voltage, to the A/D conversion circuit 37 when only switch SW1 is on. The VREF switching circuit 38 similarly outputs the second highest reference voltage, VREF2, when only switch SW2 is on; outputs the third highest reference voltage, VREF3, when only switch SW3 is on; and outputs the lowest reference voltage, VREF4, when only switch SW4 is on.

The decoder circuit 39 is connected to the control circuit unit 4 described below by unit of a serial communication line SL. The decoder circuit 39 decodes the control signal input form the control circuit unit 4, and based on the code contained in the control signal outputs a signal controlling the on/off states of the switches SW1 to SW4 to the selection lines SEL1 to SEL4.

(3) Configuration of the Control Circuit Unit 4

As described above the control circuit unit 4 controls operation of the reception circuit unit 3, and more specifically outputs the control signal for switching the reference voltage VREF to the decoder circuit 39 of the reception circuit unit 3. The control circuit unit 4 decodes the TCO signal input form the A/D conversion circuit 37, and sets the time of the time counter 43 based on the decoded time code. The control circuit unit 4 also controls displaying the time of the time counter 43 on the display unit 5.

As shown in FIG. 1 the control circuit unit 4 includes a TCO decoder unit 41 as the time code decoder, a storage unit 42, the time counter 43, a time code generator unit 44 as a time code generator, a duty evaluation unit 45 as a duty evaluation unit, a drive circuit unit 46, and a control unit 47 as a level switching unit. The reference signal output from the crystal oscillator 48 is input to the control unit 47.

The TCO decoder unit 41 decodes the TCO signal input from the A/D conversion circuit 37 of the reception circuit unit 3, and extracts the time code containing the date information and time information that is contained in the TCO signal. The TCO decoder unit 41 outputs the extracted time code to the control unit 47.

More specifically, the TCO decoder unit 41 recognizes the waveform of the TCO signal, and measures the received pulse duty cycle relative to a prescribed pulse width (such as 1 Hz). The TCO decoder unit 41 then recognizes the time code from the TCO signal based on differences in the duty of the received pulses. The JJY standard time signal transmitted in Japan carries three types of pulses at 1 bps as shown in FIG. 3 with a HIGH pulse width of 0.5 second (50% duty cycle) denoting a binary 1 (a 1 signal), a HIGH pulse width of 0.8 second (80% duty cycle) denoting a binary 0 (0 signal), and a HIGH pulse width of 0.2 second (20% duty cycle) denoting a position marker (P signal). The TCO decoder unit 41 recognizes the particular time code of the JJY signal from the sequence of 1s, 0s, and P signals in the time code.

While the time code of the JJY time signal can be recognized as described above, the time code carried by other types of time signals can also be identified from the duty ratio of the encoded pulses. As shown in FIG. 4, FIG. 5, and FIG. 6, for example, a binary 1 in the WWVB standard time signal broadcast in the United States has a duty cycle of 50%, a binary 0 has a duty cycle of 20%, and the P signal has a duty cycle of 80%. In the DCF77 standard time signal broadcast in Germany, a binary 1 has a duty cycle of 80% and a binary 0 has a duty cycle of 90%. In the MSF standard time signal broadcast in Great Britain, a binary 1 has a duty cycle of 80%, a binary 0 has a duty cycle of 90%, and the P signal has a duty cycle of 50%.

The storage unit 42 is memory for storing the data and programs required by the control circuit unit 4 to control the reception circuit unit 3. The storage unit 42 stores a signal data table that is compiled when the radio-controlled timepiece 1 is manufactured and records signal data related to the standard time signals received by the reception circuit unit 3.

This signal data table records signal type data linked to the corresponding reference signal data as one signal data record, and stores a plurality of signal data records in a table.

The time counter 43 keeps the time (internal time) based on the reference signal output from the crystal oscillator 48. More specifically, the time counter 43 has a second counter that counts the seconds, a minute counter that counts the minutes, and an hour counter that counts the hours.

When the crystal oscillator 48 outputs a 1-Hz reference signal, the second counter is a loop counter that repeats every time it counts 60 reference signals, or every 60 seconds. The minute counter is a loop counter that counts one each time 60 1-Hz reference pulses are counted, and repeats every 60 minutes, that is, after counting to 60. The hour counter is a loop counter that counts one every 3600 pulses of the 1-Hz reference signal, and repeats every 24 count, that is, every 24 hours.

The second counter can be configured to output a signal to the minute counter every time the second counter counts to 60, and the minute counter can be configured to increment when this signal is applied from the second counter. Likewise, the minute counter can be configured to output a signal to the hour counter every time the minute counter counts to 60, and the hour counter can be configured to increment when this signal is applied from the minute counter.

The time code generator unit 44 generates a reference time code based on the time kept by the time counter.

More specifically, the time code generator unit 44 reads the signal type settings data from the reception settings data stored in the storage unit 42, and generates the reference time code according to the type of standard time signal recorded in the signal type settings data. For example, if the signal type settings data is set to the JJY standard time signal used in Japan and this embodiment of the invention, the time code generator unit 44 generates the reference time code according to the JJY time code format.

Using the JJY time code format as shown in FIG. 7, one bit is transmitted each second, and one record is transmitted over 60 seconds. In other words, one frame contains 60 data bits. Data fields include current time information, including the minute and hour, and calendar information including the number of days since January 1 of the current year, the year (the lowest two digits of the Gregorian calendar year), and the day of the week. The value of each field is derived from the sum of the values assigned to each bit (each second), and whether a particular bit is on or off is determined from the signal type.

The time code generator unit 44 generates the reference time code starting from the header and including the hour and minute of the current time according to the JJY time code format described above, that is, the first 20 seconds of the time signal.

The time code generator unit 44 outputs the resulting reference time code to the duty evaluation unit 45.

The duty evaluation unit 45 compares the received pulse duty cycle of the TCO signal input from the reception circuit unit 3 with the reference duty cycle of the reference time code output by the time code generator unit 44, and determines if the received pulse duty cycle of the TCO signal matches the reference duty cycle of the reference time code. More particularly, the duty evaluation unit 45 measures the received pulse duty cycle of the input TCO signal and the reference time code using the method shown in FIG. 8.

The measuring method shown in FIG. 8 samples the input TCO signal and reference time code for a prescribed time at a sampling clock of 64-Hz or 100-Hz, for example, generated based on the reference clock, and determines if the signal level of the sample TCO signal is high or low. The TCO decoder unit 41 outputs a binary 1 if the sampled TCO signal pulse and the reference time code are both high, and outputs a binary 0 if low. If the received signal is sampled for 30 seconds using a 100-Hz sampling clock, there will be 30*100=3000 samples. If 751 binary 1s are detected, the received pulse duty cycle is 751/3000=25%.

The invention is not limited to the method shown in FIG. 8, and the pulse duty cycle can be measured using the method shown in FIG. 9.

The method shown in FIG. 9 uses rising edge detection to detect the rising edge U of the TCO signal and the reference time code, start a timer from the point where a rising edge U is detected, and measure the time until a falling edge D is detected. This time from the rising edge U to the falling edge D is measured repeatedly, and the received pulse duty and reference duty are determined by calculating the ratio of the sum of the times T from the rising edge U to the falling edge D to the total sampling time of the TCO signal and reference time code.

The duty evaluation unit 45 then compares the received pulse duty cycle of the TCO signal measured and calculated by the method described above with the reference duty cycle of the reference time code, and determines if the received pulse duty cycle of the TCO signal matches the reference duty cycle. The duty evaluation unit 45 then recognizes the signal type settings data of the reception settings data stored in the storage unit, and compares the received pulse duty cycle for the part of the TCO signal containing the time information for the hour and minute with the reference duty cycle. For example, if the signal type settings data is configured for the JJY time signal in Japan, the duty evaluation unit 45 detects the received pulse duty cycle in the first 20 seconds of the TCO signal starting from the header denoting the beginning of the TCO signal, that is, the part of the signal containing the hour and minute time information, and compares the duty cycle of the pulses received in this part of the signal with the reference duty cycle.

A match as used here allows for error of approximately 1% to 3% caused by the deviation between the time kept by the time counter and the effect of the reception environment, for example. More specifically, the duty evaluation unit 45 confirms a match between the received pulse duty cycle and the reference duty cycle if the difference therebetween is approximately 1% to 3%.

If the duty evaluation unit 45 determines that the received pulse duty cycle of the TCO signal and the reference duty cycle do not match, the duty evaluation unit 45 determines whether the received pulse duty cycle of the TCO signal is greater than or less than the reference duty cycle.

Based on the time display control signal output from the control unit 47, the drive circuit unit 46 controls the display state of the display unit 5 and controls displaying the time on the display unit 5. For example, if the display unit 5 has an LCD panel and displays the time on the LCD panel, the drive circuit unit 46 controls the LCD panel based on the time display control signal and controls displaying the time on the LCD panel. If the display unit 5 has a movement with a dial and hands, the drive circuit unit 46 outputs a pulse signal to the stepping motor that drives the hands and thus controls moving the hands by unit of the drive force from the stepping motor.

The control unit 47 is driven based on the drive frequency input from the crystal oscillator 48 to execute different control processes. More specifically, the control unit 47 outputs the time code input from the TCO decoder unit 41 to the time counter 43, and controls adjusting the count of the time counter 43. The control unit 47 also outputs a time display control signal for displaying the time kept by the time counter 43 on the display unit 5 to the drive circuit unit 46.

The control unit 47 also outputs a prescribed control signal to the reception circuit unit 3 based on the result output from the duty evaluation unit 45.

More specifically, if the operating signal input from the external operating member 6 contains signal type settings data for setting the type of standard time signal, the control unit 47 updates the signal reception configuration data of the storage unit 42 based on the signal type settings data. For example, if operation of the external operating member 6 inputs an operating signal containing signal type settings data that sets the type of received standard time signal to the JJY signal, the control unit 47 records the signal type settings data for receiving the JJY signal in the reception settings data stored in the storage unit 42.

If operation of the external operating member 6 inputs an operating signal for setting the time based on the received standard time signal, or if the preset time for setting the time arrives, the control unit 47 instructs the time code generator unit 44 to output the reference time code, and instructs the duty evaluation unit 45 to compare and evaluate the reference duty cycle of the reference time code output by the time code generator unit 44 and the received pulse duty cycle of the TCO signal.

If the duty evaluation unit 45 determines that the received pulse duty cycle of the TCO signal is greater than the reference duty cycle of the reference time code, the control unit 47 outputs a control signal to the reception circuit unit 3 to increase the reference voltage of the VREF switching circuit 38 one level. If the duty evaluation unit 45 determines that the received pulse duty cycle of the TCO signal is less than the reference duty cycle of the reference time code, the control unit 47 outputs a control signal to the reception circuit unit 3 to decrease the reference voltage of the VREF switching circuit 38 one level.

As described above the control unit 47 and the decoder circuit 39 are connected by unit of a serial communication bus SL, and the control signal is input through the serial communication bus SL to the decoder circuit 39. As a result, the control signal controlling switching the voltage of the VREF switching circuit 38 can be output through the decoder circuit 39 to the VREF switching circuit 38.

A two-line synchronous interface enabling two-way communication between the control unit 47 and reception circuit unit 3 can be used to enable two-way serial communication by both the control unit 47 and the reception circuit unit 3. In this configuration the control unit 47 outputs a control signal to the reception circuit unit 3, the reception circuit unit 3 then returns the received and recognized control signal to the control unit 47, and the control unit 47 detects any difference in the data of the control signal output by the control unit 47 and the control signal input to the control unit 47, thereby assuring highly reliable serial communication.

(4) Operation of the Radio-Controlled Timepiece 1

The operation whereby the radio-controlled timepiece 1 described above adjusts the time using the received standard time signal is described next.

Figure 10:
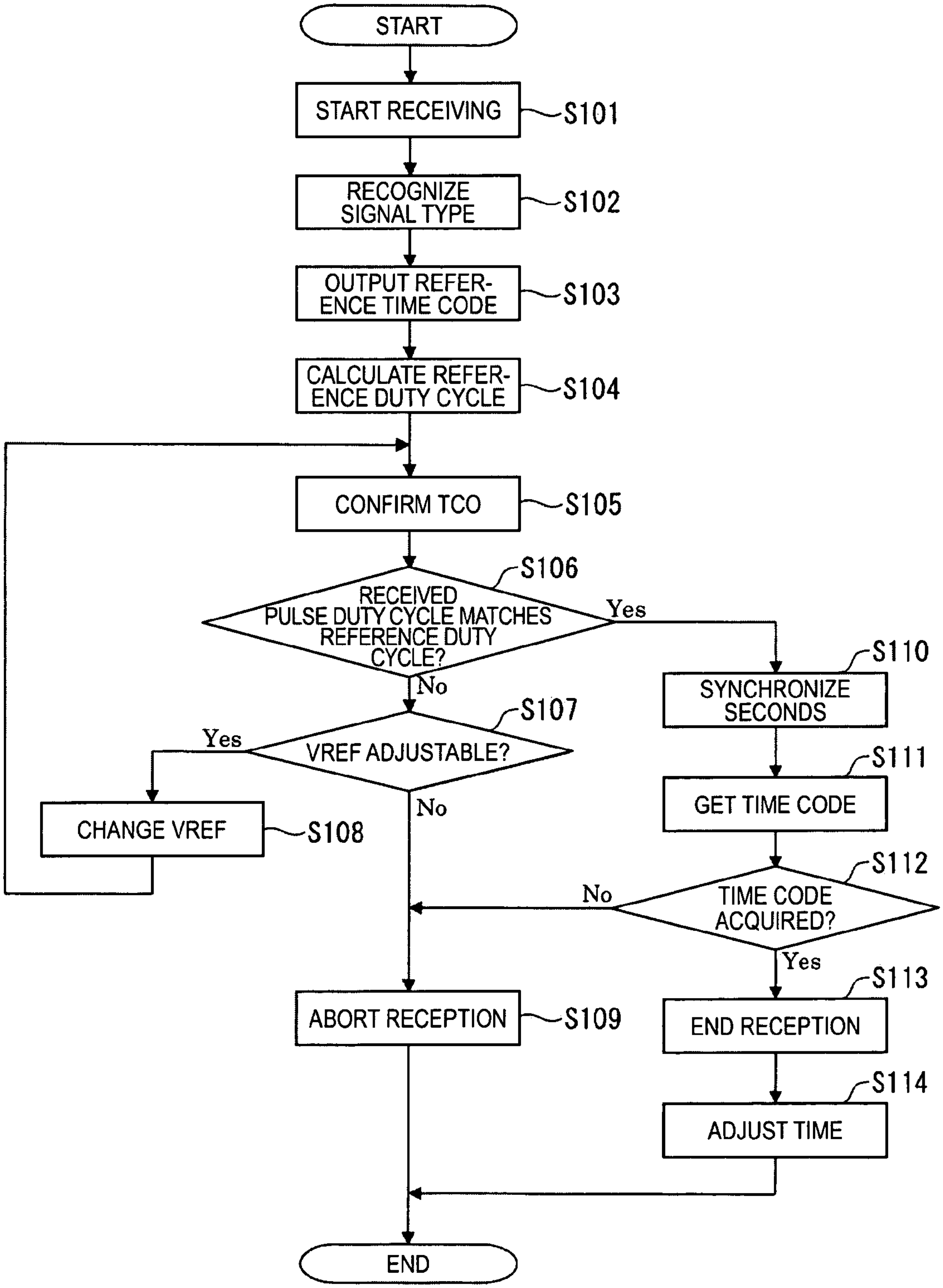
FIG. 10 is a flow chart describing the time adjustment operation of the radio-controlled timepiece 1.

FIG. 10 is a flow chart describing the time setting operation of the radio-controlled timepiece 1.

Figure 11:
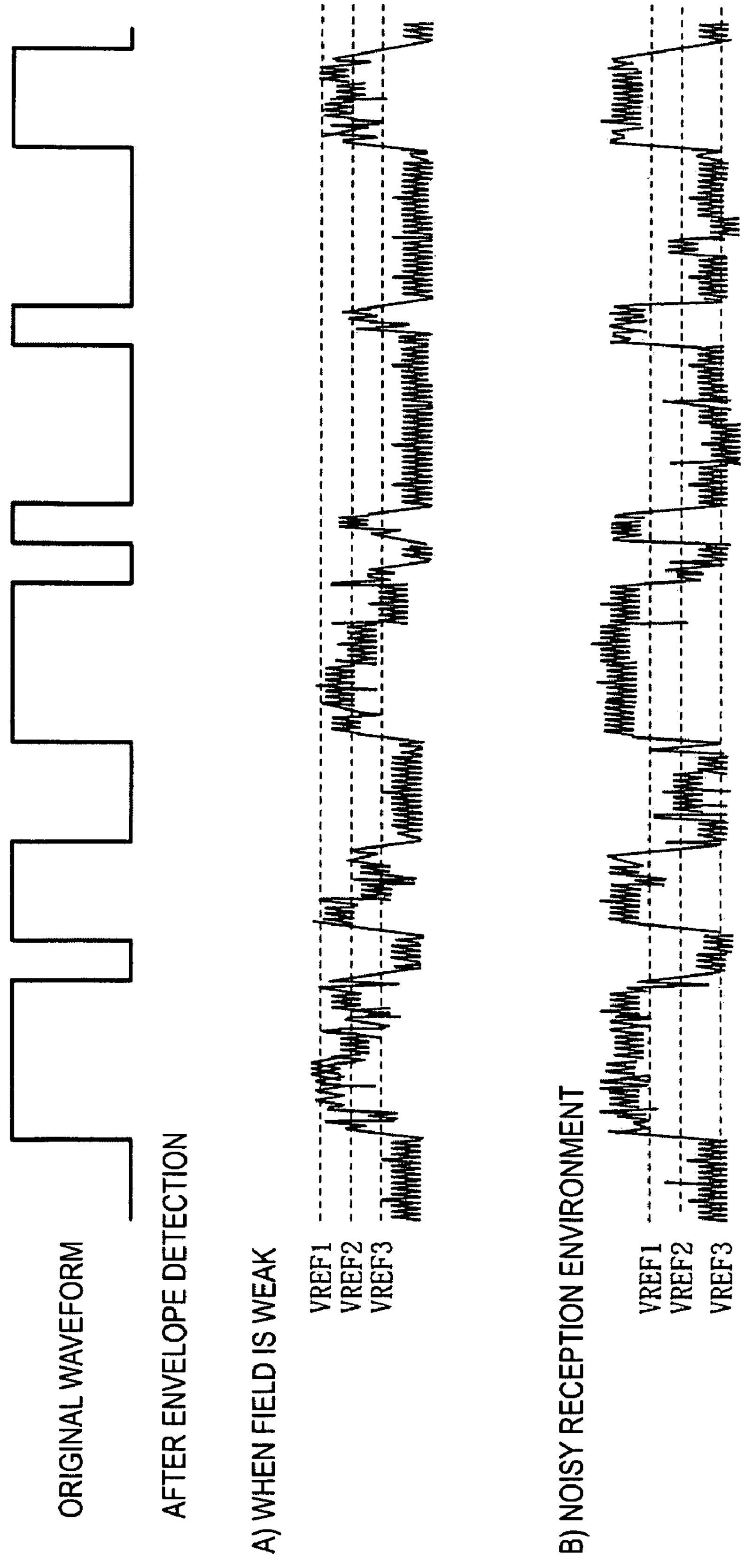
FIG. 11 shows the original waveform of the time code contained in the standard time signal, the waveform of the envelope signal when the standard time signal is received in a weak field environment, and the waveform of the envelope signal when the standard time signal is received in a noisy environment.

FIG. 11 shows the original waveform of the time code contained in the standard time signal, the waveform of the envelope signal when the standard time signal is received in a weak field environment, and the waveform of the envelope signal when the standard time signal is received in a noisy environment.

Figure 12:
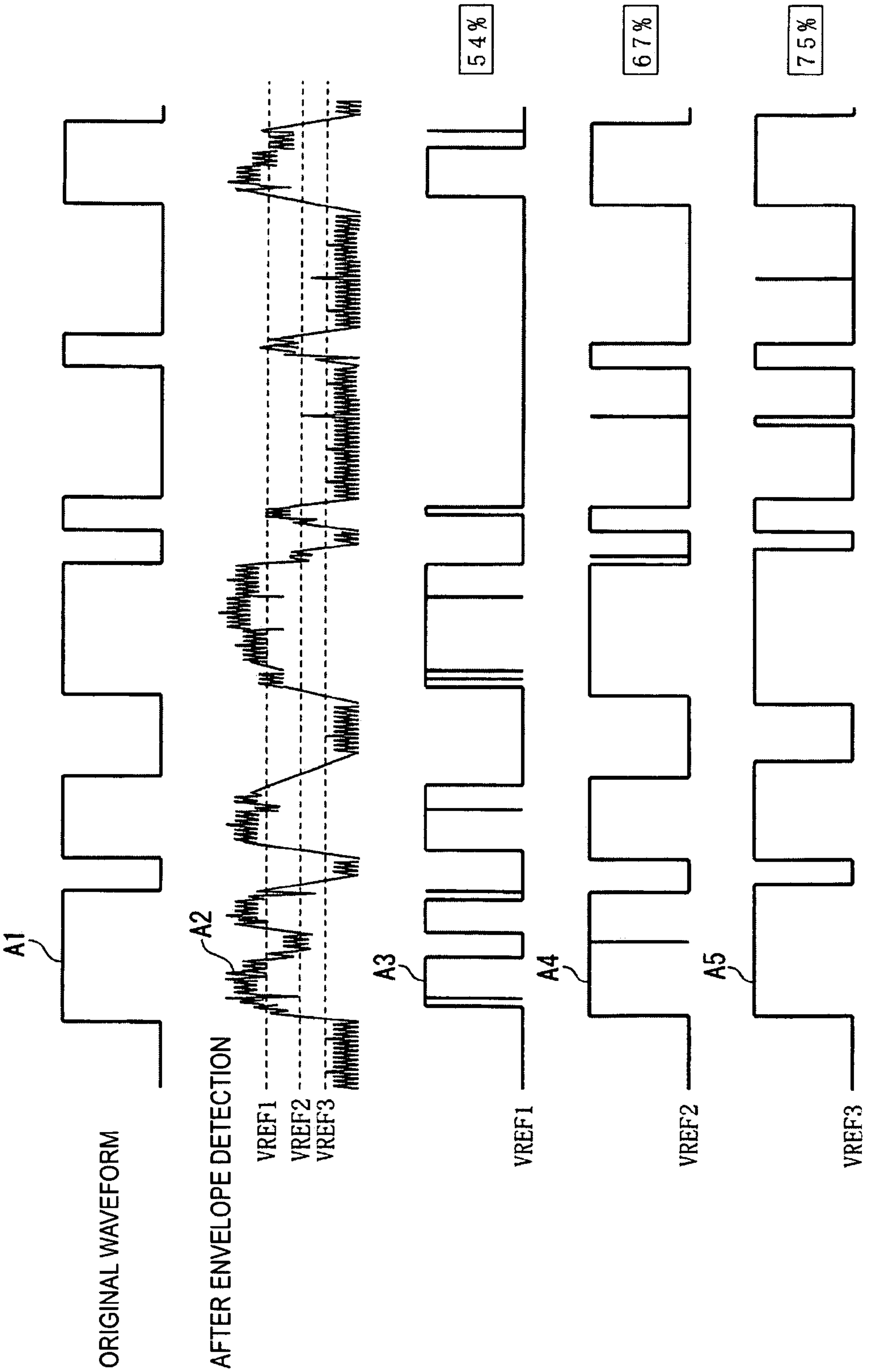
FIG. 12 shows the original waveform of the time code contained in the standard time signal, and the waveforms of the TCO signal digitized using different reference voltages after detecting the envelope of the received standard time signal.

FIG. 12 shows the original waveform of the time code contained in the standard time signal, and the waveforms of the TCO signal digitized using different reference voltages after detecting the envelope of the received standard time signal.

The signal data table is written and stored in the storage unit 42 when the radio-controlled timepiece 1 is manufactured. The signal type settings data for the reception settings data is also set to a default value, such as the JJY signal in this example, when the radio-controlled timepiece 1 is manufactured. The radio-controlled timepiece 1 in this embodiment of the invention is therefore preconfigured when the reception circuit is manufactured for decoding the time code contained in the JJY signal.

If an operating signal for setting the time based on the received standard time signal is input from the external operating member 6, or if the preset time for setting the time arrives, the control unit 47 of the radio-controlled timepiece 1 receives the standard time signal through the antenna 2 and controls starting the operation for adjusting (setting) the time (step S101).

The standard time signal received by the antenna 2 in step S101 is converted by the tuning circuit 31 to a voltage signal (reception signal). The first amplifier circuit 32, the bandpass filter 33, the second amplifier circuit 34, and the envelope detection circuit 35 then amplify the reception signal to a prescribed level, extract the signals in a desired frequency band, rectify and filter the signal to acquire the envelope signal. This envelope signal is then digitized by the A/D conversion circuit 37 to derive the TCO signal, which is output to the control circuit unit 4.

After step S101, the control unit 47 of the control circuit unit 4 recognizes the signal type settings data from the reception settings data stored in the storage unit 42. In the default state the signal type settings data is set to the JJY signal as described above, and the control unit 47 therefore recognizes the received standard time signal as the JJY signal. If the reception settings data is changed by operating the external operating member 6, the control unit 47 recognizes the type of standard time signal defined by the changed reception settings data (step S102). The control unit 47 then outputs the recognized reception settings data to the time code generator unit 44.

The time code generator unit 44 of the control circuit unit 4 then generates the reference time code based on the time counter 43 (step S103). The time code generator unit 44 recognizes the reception settings data input from the control unit 47, and generates the reference time code for the portion of the standard time signal containing the hour and minute time information according to the declared time signal type. For example, if the reception settings data is set to the JJY standard time signal used in Japan, the time code generator unit 44 generates the reference time code for the part of the signal from the header to the hour field of the current time information according to the JJY time code format, that is, for the portion of the signal from 0 to 20 seconds. The time code generator unit 44 outputs the generated reference time code to the duty evaluation unit 45.

After step S103 the duty evaluation unit 45 of the control circuit unit 4 calculates the reference duty cycle of the reference time code according to the method described in FIG. 8 or FIG. 9 when the reference time code is input from the time code generator unit 44.

When the TCO signal is input from the reception circuit unit 3 (step S105), the duty evaluation unit 45 computes the received pulse duty cycle of the TCO signal according to the method described in FIG. 8 or FIG. 9. The duty evaluation unit 45 then compares and determines if the received pulse duty cycle matches the reference duty cycle output from step S104 (step S106).

As shown in FIG. 11, the envelope signal acquired by envelope detection by the reception circuit unit 3 varies according to the reception environment of the standard time signal. For example, if there is little ambient noise in the reception environment but the field is weak due to being a long distance from the transmitter, the standard time signal will be weak, the amplitude of the envelope signal will be low, and the signal level also drops. If the reception environment is noisy, the received standard time signal will be affected by the noise and both the amplitude and signal level will rise. When this envelope signal is then digitized by the A/D conversion circuit 37, the waveform of the resulting digital signal (TCO signal) will vary according to the reference voltage that is used.

In step S106 the duty evaluation unit 45 calculates the received pulse duty cycle for the type of TCO signal, and determines if the received pulse duty cycle matches the reference duty cycle.

In this example, as shown in FIG. 12, the JJY time signal containing a TCO signal as shown in A1 is received, the reception circuit unit 3 detects the envelope as described above, and outputs a signal with a waveform as shown in A2 in FIG. 12.

If the reference voltage output by the VREF switching circuit 38 is set to a high voltage, such as VREF1, the reception circuit unit 3 outputs a TCO signal with a waveform such as shown in A3 to the control circuit unit 4. In this case the duty evaluation unit 45 compares the reference duty cycle (68%) of the reference time code calculated in step S104 with the received pulse duty cycle of the processed TCO signal (54%), and determines that the received pulse duty cycle of the TCO signal is less than the reference duty cycle.

If the reference voltage output by the VREF switching circuit 38 is set to a low voltage, such as VREF3, the reception circuit unit 3 outputs a TCO signal with a waveform such as shown in A5 to the control circuit unit 4. In this case the duty evaluation unit 45 compares the reference duty cycle (68%) of the reference time code calculated in step S104 with the received pulse duty cycle of the processed TCO signal (75%), and determines that the received pulse duty cycle of the TCO signal is greater than the reference duty cycle.

If the reference voltage output by the VREF switching circuit 38 is set to a middle voltage, such as VREF2, the reception circuit unit 3 outputs a TCO signal with a waveform such as shown in A4 to the control circuit unit 4. In this case the duty evaluation unit 45 compares the reference duty cycle (68%) of the reference time code calculated in step S104 with the received pulse duty cycle of the processed TCO signal (67%), and determines that the received pulse duty cycle of the TCO signal matches the reference duty cycle.

If the duty evaluation unit 45 decides that the received pulse duty cycle and the reference duty cycle do not match, the control unit 47 determines if the reference voltage can be changed in the VREF switching circuit 38 (step S107), and if the reference voltage can be changed outputs a control signal to the reception circuit unit 3 to change the reference voltage.

For example, if a TCO signal such as shown in A3 in FIG. 12 is acquired, the received pulse duty cycle of the TCO signal will be determined to be less than the reference duty cycle. The control unit 47 therefore outputs a control signal to decrease the reference voltage output by the VREF switching circuit 38 one level (setting the reference voltage to VREF2) in order to increase the received pulse duty cycle.

If a TCO signal such as shown in A5 in FIG. 12 is acquired, the received pulse duty cycle of the TCO signal will be determined to be greater than the reference duty cycle. The control unit 47 therefore outputs a control signal to increase the reference voltage output by the VREF switching circuit 38 one level (setting the reference voltage to VREF2) in order to decrease the received pulse duty cycle.

The amplitude of the envelope signal can be decreased and the signal level can be decreased by thus changing the reference voltage to accommodate a weak standard time signal when the reception environment is a weak field such as shown in FIG. 11A, but an accurate TCO can be acquired by also lowering the reference voltage to lower the A/D conversion level. In addition, the amplitude and signal level rise due to the effects of noise on the received standard time signal when the reception environment is noisy as shown in FIG. 11B, but an accurate TCO can be acquired by increasing the reference voltage to increase the A/D conversion level.

When a control signal as described above is input, the reception circuit unit 3 decodes the control signal by unit of the decoder circuit 39 and outputs to the VREF switching circuit 38. The VREF switching circuit 38 then changes the reference voltage based on the control signal. This changes the reference voltage used by the A/D conversion circuit 37, and outputs a TCO signal with a corrected waveform to the control circuit unit 4 again.

However, if step S107 decides that the reference voltage cannot be changed, such as when the current reference voltage setting is already the lowest voltage setting of VREF4 and the received pulse duty cycle of the TCO signal is less than the reference duty cycle, receiving the standard time signal is aborted and the time adjustment process ends (step S109).

If in step S106 the duty evaluation unit 45 decides that the received pulse duty cycle matches the reference duty cycle as shown in A4 in FIG. 12, the control unit 47 applies a seconds synchronization process based on the TCO signal being received (step S110). The standard time signal is a signal that carries one time code per minute and transmits a binary 0, a binary 1, or a position marker P signal once every second. The signals encoded in the time signal can therefore be read by detecting the rising edge, for example, of the standard time signal pulses transmitted at 1 bit/second and synchronizing to the second.

The control unit 47 then causes the TCO decoder unit 41 to decode the TCO signal and controls acquiring the time code (step S111). The standard time signal pulses are sequentially input to the antenna 2 and the standard time signal is received by the reception circuit unit 3, but during the time code decoding process in step S109 the control unit 47 holds the voltage setting of the VREF switching circuit 38 and does not change the reference voltage (threshold value) used by the A/D conversion circuit 37 during the decoding process.

The control unit 47 then decides if an accurate time code was acquired in step S111 (step S112). If an accurate time code was acquired, the control unit 47 causes the reception circuit unit 3 to stop the standard time signal reception process (step S113). The control unit 47 then outputs the acquired time code to the time counter 43, adjusts the count of the time counter 43, and adjusts the time displayed by the display unit 5 (step S114).

If step S112 determines that an accurate time code could not be acquired because the received pulse duty cycle is different, for example, step S109 executes to stop the reception operation and abort adjusting the time.

(5) Effect of the Radio-Controlled Timepiece 1 According to the First Embodiment of the Invention As described above, the duty evaluation unit 45 of the radio-controlled timepiece 1 described above compares the reference duty cycle of a reference time code generated by the time code generator unit 44 based on the time kept by the time counter 43 with the received pulse duty cycle of the TCO signal. If the duty evaluation unit 45 decides that the received pulse duty cycle of the TCO signal does not match the reference duty cycle, the control unit 47 outputs a control signal to the reception circuit unit 3 to change the reference voltage of the A/D conversion circuit 37.

As a result, the received pulse duty cycle of the TCO signal output from the A/D conversion circuit 37 can be optimized to match the reference duty cycle. Furthermore, because the time code generator unit 44 generates a reference time code according to the current time and the TCO decoder unit 41 decodes a received TCO signal that has a pulse duty cycle matching the reference duty cycle of the reference time code, the reliability of the TCO signal can also be improved, an accurate time code can be acquired, and the time of the radio-controlled timepiece 1 can be accurately adjusted based on the decoded time code.

Whether the received pulse duty cycle matches the reference time code can be determined by simply comparing the part of the TCO signal recording the hour and minute time information. For example, if the JJY time signal is received and processed, whether the received pulse duty cycle matches the reference time code can be determined by receiving only the 20-second long time code.

This decision can therefore be made in less time than is possible with conventional methods that cannot determine if the correct time code was received without receiving the time signal for several minutes to acquire the time code plural times. The average reception time of the radio-controlled timepiece can therefore be shortened and power consumption can be reduced.

Because the reference voltage of the A/D conversion circuit 37 can be changed, the threshold level can be adjusted appropriately for the reception signal even if the reception environment is slightly poor, and the correct time code can be acquired. The effect of the reception environment, including noisy environments and weak signal areas, can therefore be reduced and the correct time can be set.

Furthermore, because the time code generator unit 44 generates a reference time code according to the current time, the radio-controlled timepiece 1 can run the operation to adjust the time at the timing desired by the user for setting the time.

While the TCO decoder unit 41 is decoding the TCO signal to get the time code, the control unit 47 holds the reference voltage set in the VREF switching circuit 38 and the reference voltage used by the A/D conversion circuit 37 does not change.

Because the reference voltage thus does not change during decoding, problems such as interference with accurate decoding due to bit error, for example, can be avoided and the time code can be accurately decoded.

The reception circuit unit 3 has a decoder circuit 39, and the decoder circuit 39 decodes the control signal input from the control circuit unit 4 and outputs the decoded control signal to the VREF switching circuit 38.

Because the decoder circuit 39 thus decodes the control signal, the control signal output from the control circuit unit 4 can be set to a simplified signal, and the reliability of the communicated signal can be improved.

The time code generator unit 44 generates a reference time code conforming to the format of the type of standard time signal recorded in the signal type settings data. The duty evaluation unit 45 then compares the reference duty cycle of this reference time code generated according to the type of standard time signal with the duty cycle of the received TCO signal pulses, and the control unit 47 outputs a control signal to the reception circuit unit 3 according to result of the comparison output by the duty evaluation unit 45.

The radio-controlled timepiece 1 can therefore extract from the received standard time signal a TCO signal that is optimized according to the type of the particular time signal being received. If the radio-controlled timepiece 1 moves to a location where different standard time signals can be received, the external operating member 6 can be operated to set the type of standard time signal to be received, and the time can therefore be adjusted easily and accurately.

The reception circuit unit 3 and the control circuit unit 4 are connected by a serial communication connection. This method enables reducing the number of signal lines compared with using a parallel connection to connect the reception circuit unit 3 and the control circuit unit 4, and thus enables further simplifying the circuit design of the radio-controlled timepiece 1.

A high communication speed can also be achieved because the control circuit unit 4 can serially output the control signal to the reception circuit unit 3 over a serial connection. Furthermore, connecting the control circuit unit 4 and the reception circuit unit 3 using a pair of serial buses enables two-way communication so that after the control unit 47 outputs the control signal to the reception circuit unit 3 the reception circuit unit 3 can return the received and recognized control signal to the control unit 47, and the control unit 47 can detect any difference between the control signal data output by the control unit 47 and the control signal data input to the control unit 47. This affords serial communication with even higher reliability.

Embodiment 2

A radio-controlled timepiece 1A according to a second embodiment of the invention is described next with reference to the accompanying figures.

Figure 13:
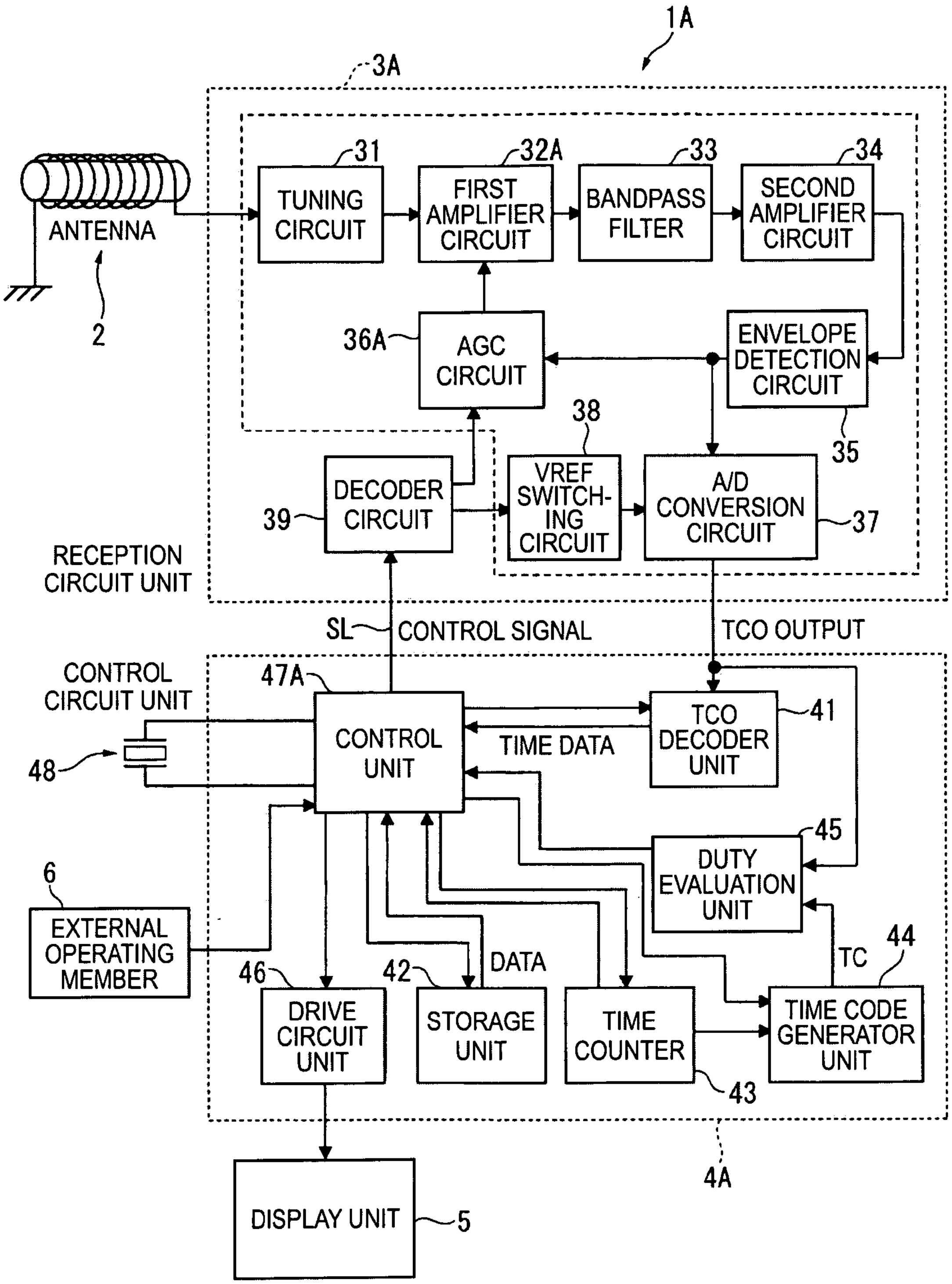
FIG. 13 is a block diagram showing the configuration of a radio-controlled timepiece according to a second embodiment of the invention.

FIG. 13 is a block diagram showing the configuration of a radio-controlled timepiece according to this second embodiment of the invention.

Figure 14:
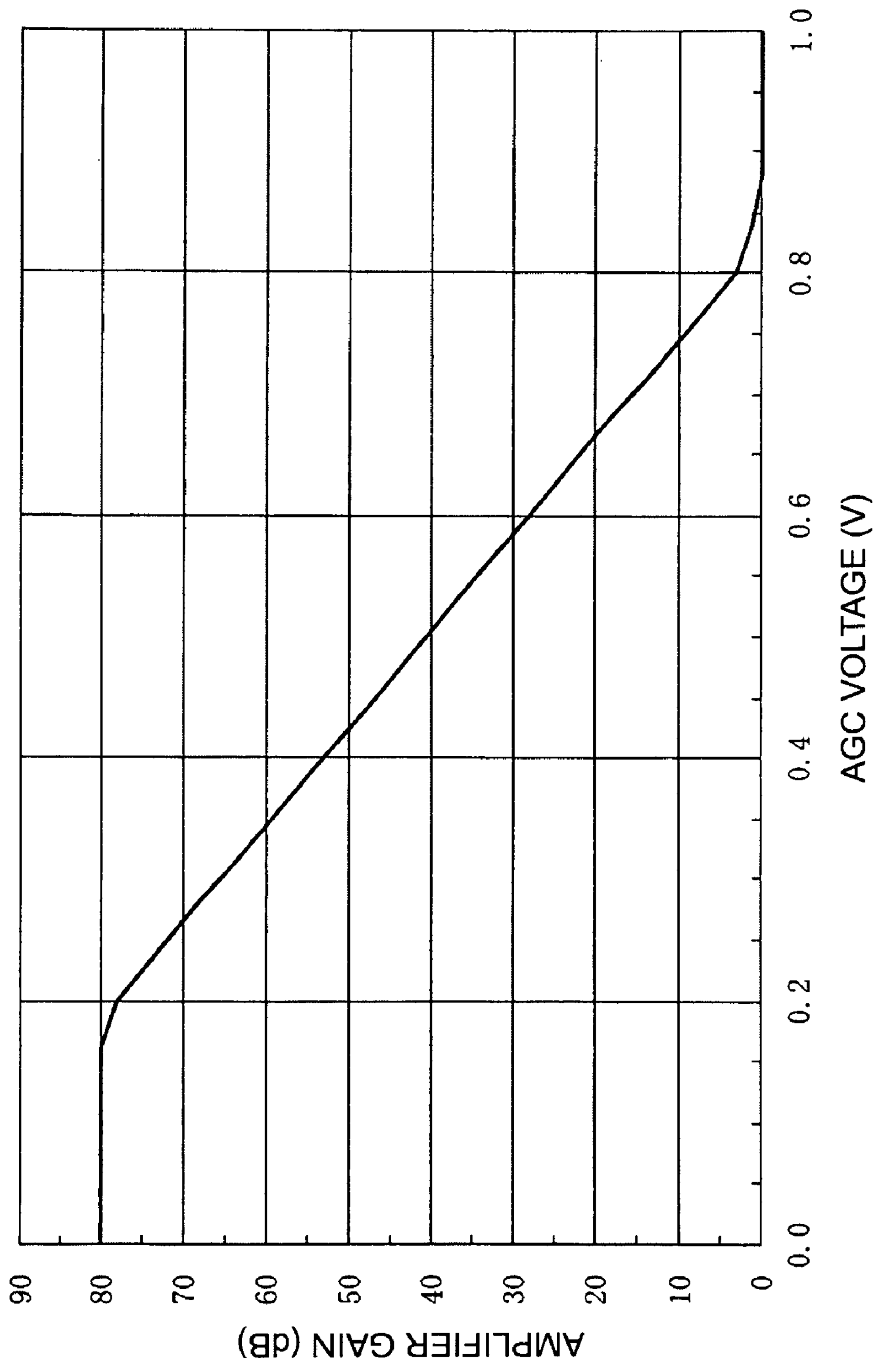
FIG. 14 is a graph of the relationship between gain and the AGC voltage in the first amplifier circuit.

FIG. 14 is a graph of the relationship between gain and the AGC voltage in the first amplifier circuit.

Figure 15:
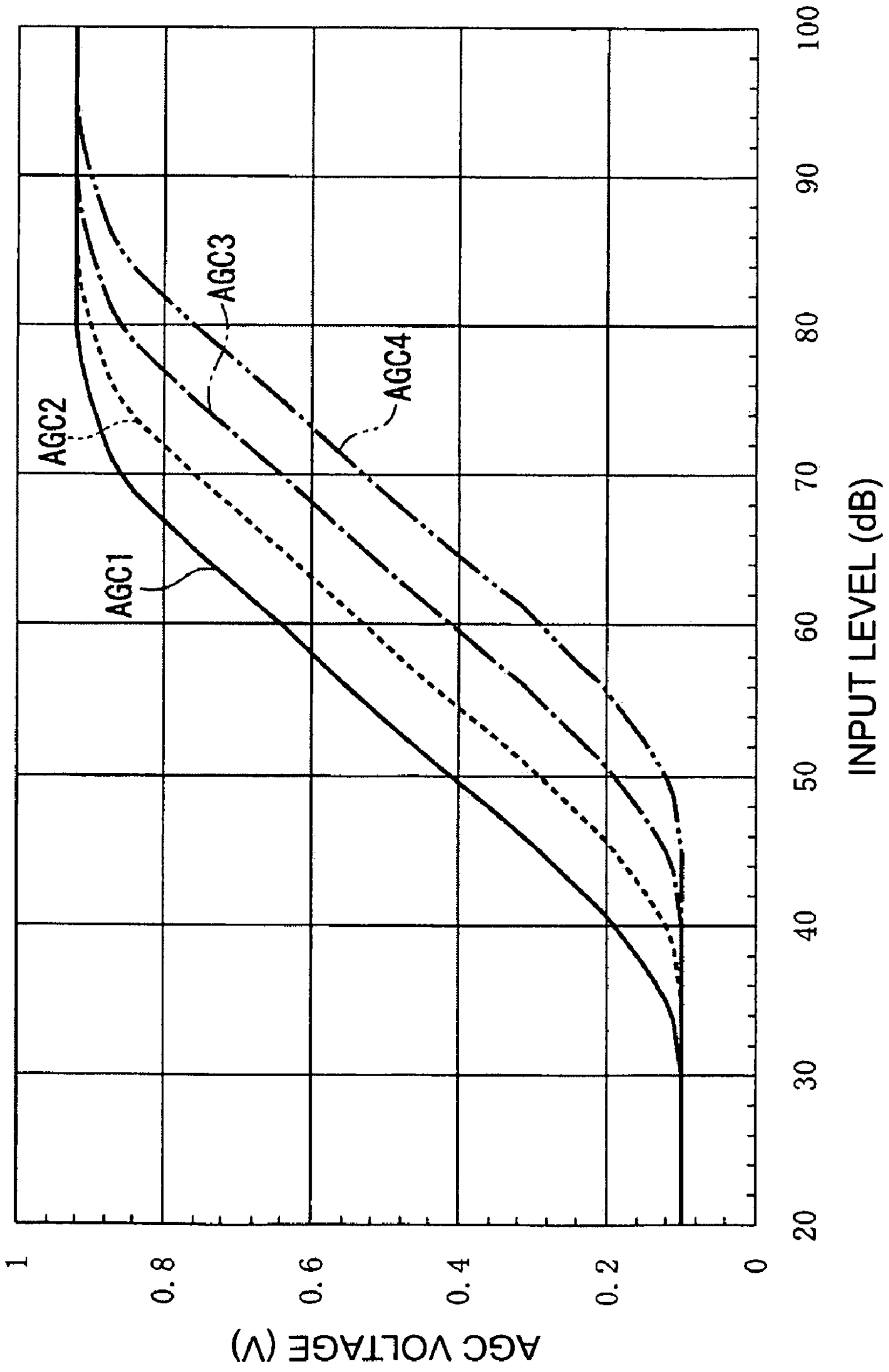
FIG. 15 is a graph of the relationship between the input level of the reception signal and the AGC voltage at the AGC characteristics that can be selected by the AGC circuit.

FIG. 15 is a graph of the relationship between the input level of the reception signal and the AGC voltage at the AGC characteristics that can be selected by the AGC circuit.

Note that like parts in the radio-controlled timepiece 1A according to this second embodiment of the invention and the radio-controlled timepiece 1 according to the first embodiment described above are identified by the same reference numerals, and further description thereof is omitted or simplified below.

(1) Configuration of the Radio-Controlled Timepiece 1A

As shown in FIG. 13 the radio-controlled timepiece 1A has an antenna 2, a reception circuit unit 3A for receiving standard time signals input to the antenna 2, a control circuit unit 4A for controlling the reception circuit unit 3A, a display unit 5 for displaying the time kept by the time counter 43 of the control circuit unit 4A, an external operating member 6 for inputting operating instructions to the radio-controlled timepiece 1A, and a crystal oscillator 48.

The control unit 47 in the first embodiment outputs a control signal to change the reference voltage of the A/D conversion circuit 37 when the duty evaluation unit 45 determines that the received pulse duty cycle of the TCO signal and the reference duty cycle are different. The control unit 47A of the radio-controlled timepiece 1A in this embodiment of the invention, however, outputs a control signal to change the signal amplification factor of the first amplifier circuit 32A when the duty evaluation unit 45 determines that the received pulse duty cycle of the TCO signal and the reference duty cycle are different (2) Configuration of the Reception Circuit Unit 3A As shown in FIG. 13, the reception circuit unit 3A has a tuning circuit 31, a first amplifier circuit 32A as an amplification unit, a bandpass filter 33, a second amplifier circuit 34, a envelope detection circuit 35, an AGC circuit 36A, an A/D conversion circuit 37, a VREF switching circuit 38, and a decoder circuit 39. The tuning circuit 31, the bandpass filter 33, the second amplifier circuit 34, and the envelope detection circuit 35 are identical to those described in the first embodiment, and further description thereof is thus omitted here.

Similarly to the first amplifier circuit 32 in the radio-controlled timepiece 1 according to the first embodiment, the first amplifier circuit 32A changes the AGC voltage and adjusts the gain according to signal input from the AGC circuit 36A, amplifies the reception signal input from the tuning circuit 31, and inputs the amplified output to the bandpass filter 33.

The relationship between the AGC voltage and gain in the first amplifier circuit 32A is shown in FIG. 14. When the AGC voltage is set in the approximate range 0.0 to 0.2 V, the gain of the first amplifier circuit 32A is 80 dB. When the AGC voltage is set greater than 0.2 V, gain drops substantially proportionally to the AGC voltage, and gain goes to approximately 0.0 dB when the AGC voltage is set to 1.0 V. The AGC voltage input to the first amplifier circuit 32A is set variably from approximately 0.1 V to 0.9 V.

The AGC circuit 36A outputs an AGC voltage to the first amplifier circuit 32A according to the AGC characteristic that is set based on the control signal input from the decoder circuit 39.

More specifically, the AGC circuit 36A selects one AGC characteristic from among AGC characteristics AGC1 to AGC4 based on the control signal as shown in FIG. 15, and outputs the AGC voltage determined by the selected AGC curve to the first amplifier circuit 32A.

For example, if AGC characteristic AGC1 is selected, the AGC circuit 36A outputs a 0.4 V AGC voltage to the first amplifier circuit 32A if the input level of the reception signal input to the first amplifier circuit 32A is approximately 50 dB. If the input level of the reception signal rises to approximately 66 dB, for example, the AGC circuit 36A inputs a 0.8 V AGC voltage to the first amplifier circuit 32A. By thus outputting an AGC voltage determined by the input level of the reception signal input to the first amplifier circuit 32A, the AGC circuit 36A controls holding the amplitude of the reception signal to a constant level according to the AGC characteristic.

The AGC voltage is selected from one of four curves AGC1, AGC2, AGC3, and AGC4 in this second embodiment of the invention as shown in FIG. 15, but one of five or more AGC voltages could be selectively output to the first amplifier circuit 32A. The AGC voltage output to the first amplifier circuit 32A could also vary continuously, but because the supply voltage used in the circuits of an electronic timepiece is a low 1.4 V, the dynamic range of the AGC voltage is narrow and the AGC characteristic is therefore preferably switched as described above.

As in the first embodiment, the decoder circuit 39 is connected to the control circuit unit 4A through a serial connection SL. The decoder circuit 39 decodes the control signal input from the control circuit unit 4A, and based on the code contained in the control signal outputs a signal for setting the AGC voltage of the AGC circuit 36A.

(3) Configuration of the Control Circuit Unit 4A

This control circuit unit 4A is substantially identical to the control circuit unit 4 of the radio-controlled timepiece 1 in the first embodiment. More particularly, as shown in FIG. 13, the control circuit unit 4A includes a TCO decoder unit 41, a storage unit 42, the time counter 43, a time code generator unit 44, a duty evaluation unit 45, a drive circuit unit 46, and the control unit 47A.

The control unit 47A in the control circuit unit 4A of the radio-controlled timepiece 1A according to this second embodiment of the invention is driven based on the drive frequency input from the crystal oscillator 48 to execute different control processes. More specifically, similarly to the control unit 47 in the first embodiment, the control unit 47A outputs the time code input from the TCO decoder unit 41 to the time counter 43, and controls adjusting the count of the time counter 43. The control unit 47A also outputs a time display control signal for displaying the time kept by the time counter 43 on the display unit 5 to the drive circuit unit 46.

The control unit 47A also outputs a prescribed control signal to the reception circuit unit 3A based on the result output from the duty evaluation unit 45.

More specifically, if the duty evaluation unit 45 determines that the received pulse duty cycle of the TCO signal is greater than the reference duty cycle of the reference time code, the control unit 47A outputs a control signal to the reception circuit unit 3A to change the AGC characteristic of the AGC circuit 36A so that the gain is reduced one level. If the duty evaluation unit 45 determines that the received pulse duty cycle of the TCO signal is less than the reference duty cycle of the reference time code, the control unit 47A outputs a control signal to the reception circuit unit 3A to change the AGC characteristic of the AGC circuit 36A so that the gain is increased one level.

(4) Operation of the Radio-Controlled Timepiece 1A

The operation whereby the radio-controlled timepiece 1A described above adjusts the time using the received standard time signal is described next.

Figure 16:
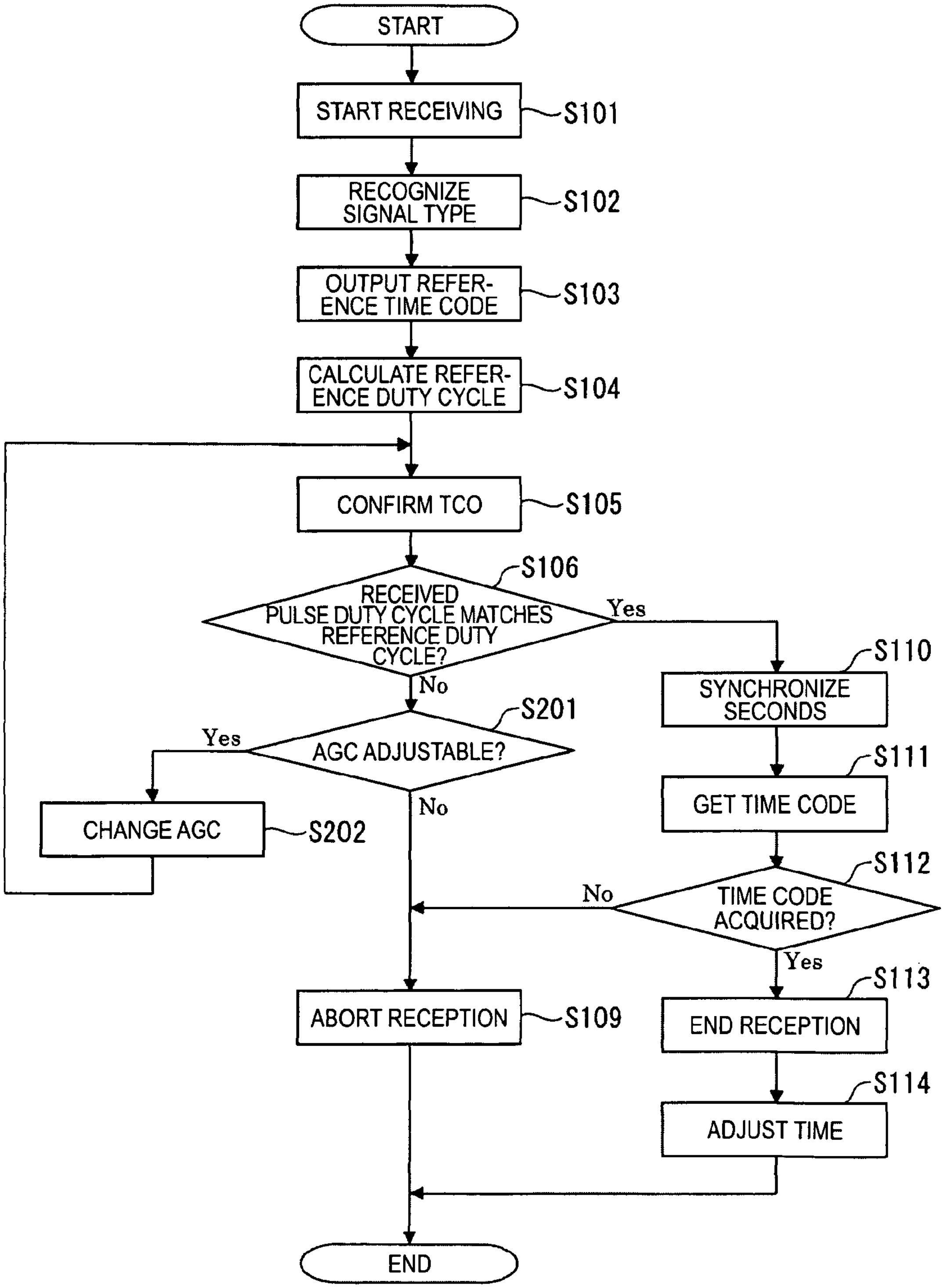
FIG. 16 is a flow chart describing the time adjustment operation of the radio-controlled timepiece according to the second embodiment of the invention.

FIG. 16 is a flow chart describing the time adjustment operation of the radio-controlled timepiece 1A.

Figure 17:
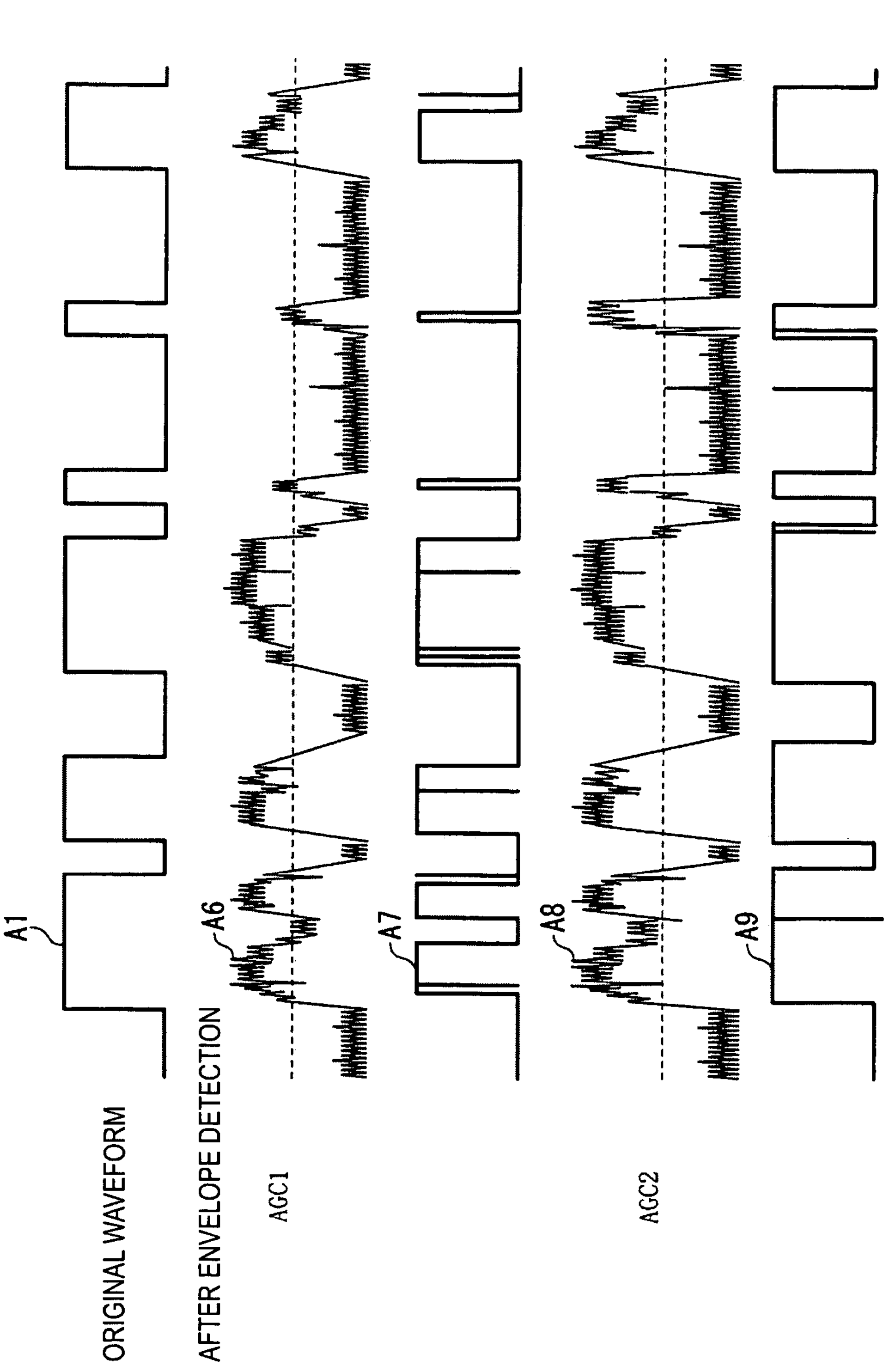
FIG. 17 shows the original waveform of the time code contained in the standard time signal, the waveform after envelope detection of the reception signal output based on the set AGC voltage characteristic, and the waveform of the TCO signal digitized from the waveform after envelope detection.

FIG. 17 shows the original waveform of the time code contained in the standard time signal, the waveform after envelope detection of the reception signal output based on the set AGC voltage characteristic, and the waveform of the TCO signal digitized from the waveform after envelope detection.

As shown in FIG. 16, the time adjustment process of the radio-controlled timepiece 1A according to this embodiment of the invention is substantially identical to the time adjustment process of the radio-controlled timepiece 1 described above. More specifically, the radio-controlled timepiece 1A executes the same process as steps S101 to S106 executed by the radio-controlled timepiece 1 described above. Further description of step S101 to step S105 is therefore omitted here, and the description of step S106 is simplified.

In step S106 the duty evaluation unit 45 in the control circuit unit 4A of the radio-controlled timepiece 1A compares the received pulse duty cycle of the TCO signal confirmed in step S105 with the reference duty cycle calculated in step S104, and determines if the received pulse duty cycle matches the reference duty cycle.

For example, as shown in FIG. 17, if the JJY time signal containing a TCO signal as shown in A1 is received and the AGC circuit 36A outputs an AGC voltage determined by AGC characteristic AGC1, the envelope signal after envelope detection will have a waveform as shown by A6 in FIG. 17, and the TCO signal resulting from the A/D conversion circuit 37 digitizing the envelope signal A6 will be a waveform such as indicated by A7 in FIG. 17.

In this case the duty evaluation unit 45 compares the reference duty cycle (68%) of the reference time code calculated in step S104 with the received pulse duty cycle of the processed TCO signal (54%), and determines that the received pulse duty cycle of the TCO signal is less than the reference duty cycle.

If the AGC circuit 36A outputs an AGC voltage determined by AGC characteristic AGC2, an envelope signal with a waveform as shown by A8 in FIG. 17 will be acquired and a TCO signal as indicated by A9 will be output. In this case the duty evaluation unit 45 compares the reference duty cycle (68%) of the reference time code calculated in step S104 with the received pulse duty cycle of the processed TCO signal (67%), and determines that the received pulse duty cycle of the TCO signal matches the reference duty cycle.

If the duty evaluation unit 45 decides in step S106 that the received pulse duty cycle and the reference duty cycle do not match, the control unit 47A determines if the AGC characteristic of the AGC circuit 36A can be changed (step S201), and if the reference voltage can be changed outputs a control signal to the reception circuit unit 3A to change the AGC characteristic.

For example, if a TCO signal as shown by A7 in FIG. 17 is acquired, the received pulse duty cycle of the TCO signal will be determined to be less than the reference duty cycle. In order to increase the received pulse duty cycle in this case, the control unit 47A must increase the gain of the first amplifier circuit 32A (lower the AGC voltage), and therefore outputs a control signal to change the AGC characteristic of the AGC circuit 36A to increase the gain one level (set the AGC characteristic to AGC2).

Though not shown in the figures, if the received pulse duty cycle of the TCO signal is than the reference duty cycle, the control unit 47A must lower the gain of the first amplifier circuit 32A (increase the AGC voltage) in order to reduce the received pulse duty cycle. The control unit 47A therefore outputs a control signal to change the AGC characteristic of the AGC circuit 36A to decrease the gain one level.

When a control signal as described above is input to the reception circuit unit 3A, the decoder circuit 39 decodes the control signal and outputs to the AGC circuit 36A (step S202). Based on this control signal, the AGC circuit 36A changes the AGC characteristic. The AGC voltage output to the first amplifier circuit 32A thus changes, and the signal amplification factor changes. As a result, when the reception signal is envelope detected and output as an envelope signal, the amplitude of the envelope signal changes compared with the original waveform, and the amplitude of the TCO signal therefore also changes.

If changing the AGC voltage is determined unnecessary in step S201, such as when the current AGC characteristic is set to AGC1 in FIG. 15 and the received pulse duty cycle of the TCO signal is determined to be greater than the reference duty cycle, step S109 executes to stop receiving the standard time signal and abort the time adjustment operation.

If in step S106 the duty evaluation unit 45 decides that the received pulse duty cycle and the reference duty cycle match as indicated by A9 in FIG. 17, steps S110 to S114 execute as described in the radio-controlled timepiece 1 of the first embodiment above.

More specifically, in step S110 the control unit 47A applies a seconds synchronization process based on the TCO signal being received, and the TCO decoder unit 41 decodes the time code from the TCO signal in step S111. Similarly to the radio-controlled timepiece 1 according to the first embodiment, the control unit 47A holds the AGC characteristic setting of the AGC circuit 36A and prevents the AGC characteristic from changing while decoding the time code in step S111.

Then in step S112 the control unit 47A decides if an accurate time code was acquired in step S111 [S109, sic]. If an accurate time code was acquired, the control unit 47A causes the reception circuit unit 3A to stop the standard time signal reception process in step S113. The control unit 47A then outputs the acquired time code to the time counter 43, adjusts the count of the time counter 43, and adjusts the time displayed by the display unit 5 in step S114.

If step S112 [S110, sic] determines that an accurate time code could not be acquired because the received pulse duty cycle is different, for example, step S109 [S107, sic] executes to stop the reception operation and abort adjusting the time.

(5) Effect of the Radio-Controlled Timepiece 1A According to the Second Embodiment of the Invention As described above, the duty evaluation unit 45A of the radio-controlled timepiece 1A described above according to the second embodiment of the invention compares the reference duty cycle of a reference time code generated by the time code generator unit 44 based on the time kept by the time counter 43 with the received pulse duty cycle of the TCO signal. If the duty evaluation unit 45 decides that the received pulse duty cycle of the TCO signal and the reference duty cycle do not match, the control unit 47A outputs a control signal to the reception circuit unit 3A to change the AGC characteristic of the first amplifier circuit 32A.

As a result, the signal amplification factor of the first amplifier circuit 32A changes, and the TCO signal can be optimized so that the received pulse duty cycle of the TCO signal output from the A/D conversion circuit 37 matches the reference duty cycle. As in a radio-controlled timepiece 1 according to the first embodiment of the invention, an accurate time code can be acquired based on the TCO signal, and the time of the radio-controlled timepiece 1A can be accurately adjusted based on the decoded time code.

Embodiment 3

A radio-controlled timepiece 1B according to a third embodiment of the invention is described next with reference to the accompanying figures.

Figure 18:
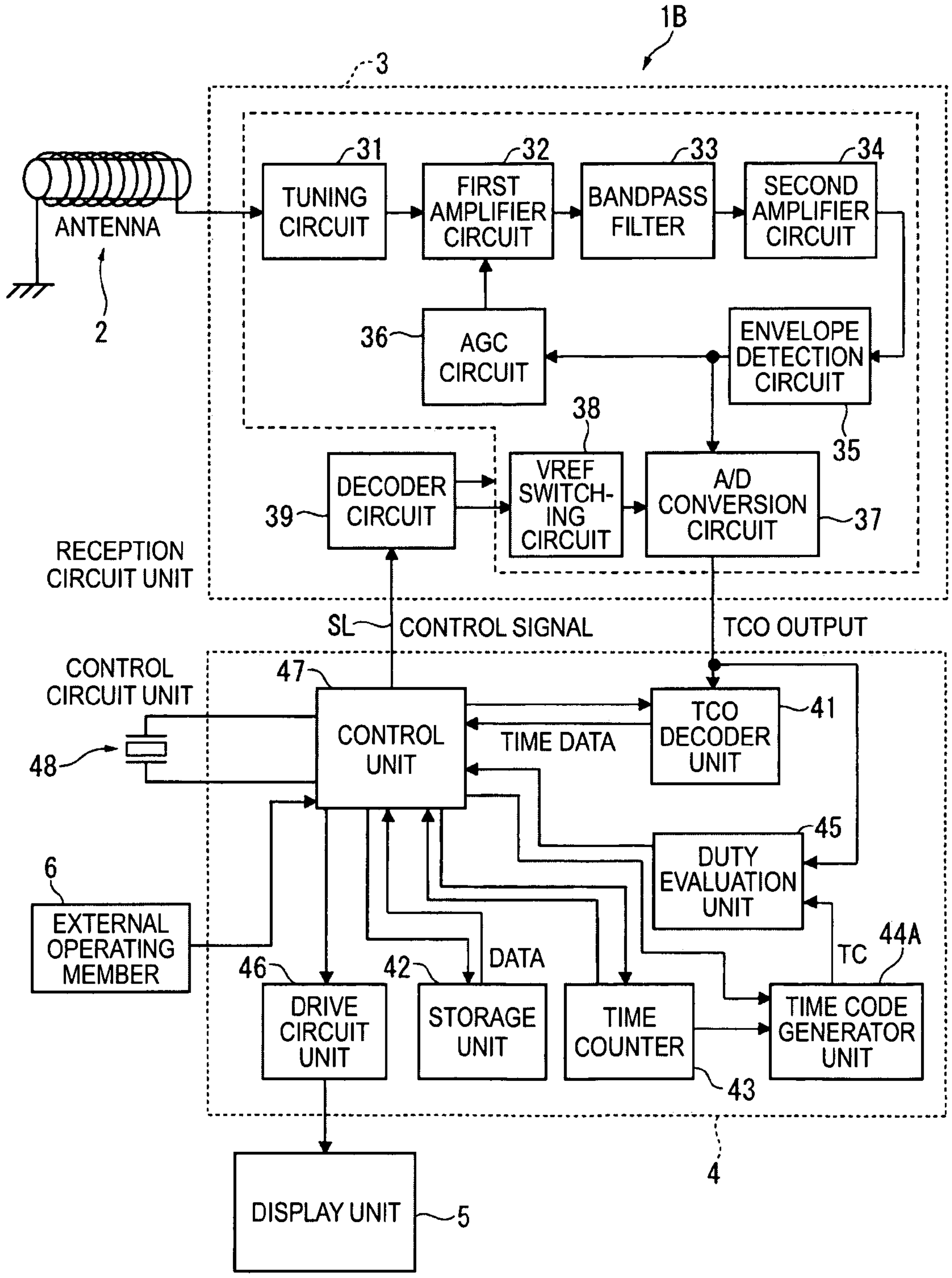
FIG. 18 is a block diagram showing the configuration of a radio-controlled timepiece according to a third embodiment of the invention.

FIG. 18 is a block diagram showing the configuration of a radio-controlled timepiece 1B according to this third embodiment of the invention.

Note that like parts in the radio-controlled timepiece 1B according to this third embodiment of the invention and the radio-controlled timepieces 1 and 1A according to the foregoing first and second embodiments described above are identified by the same reference numerals, and further description thereof is omitted or simplified below.

(1) Configuration of the Radio-Controlled Timepiece 1B According to the Third Embodiment The radio-controlled timepiece 1B according to this third embodiment of the invention differs from the radio-controlled timepiece 1 of the first embodiment in the configuration of the time code generator unit 44.

More particularly, the time code generator unit 44A in this radio-controlled timepiece 1B also functions as the internal time reliability determination unit and the time code generator of the accompanying claims.

More particularly, the time code generator unit 44A determines the reliability of the internal time counted by the time counter 43 of the radio-controlled timepiece 1B. The reliability of the internal time can be determined by, for example, storing a time adjustment history relating to the time that the time adjustment process was run in the storage unit 42, and the time code generator unit 44A reading this time adjustment history to determine if the reliability of the internal time is high or low. The time code generator unit 44A determines the reliability of the internal time is low (1) when there is no history of adjusting the time in the time adjustment history, such as when the time adjustment process based on reception of the standard time signal has not succeeded once after the internal time has been reset; (2) when the time adjustment process based on reception of the standard time signal has not been executed for at least a prescribed time (such as one week) since the last time adjustment process recorded in the time adjustment history; and (3) when the last time adjustment process recorded in the time adjustment history was a time adjustment process that was manually invoked by a user operation.

If the reliability of the internal time is determined to be low, the time code generator unit 44A does not generate the reference time code. If the reliability of the internal time is determined to be high because none of the conditions described above are met, the time code generator unit 44A generates the reference time code based on the time (internal time) kept by the time counter in the same way as the time code generator unit 44 described in the first embodiment of the invention.

(2) Operation of the Radio-Controlled Timepiece 1B

The time adjustment operation of the radio-controlled timepiece 1B according to this embodiment of the invention is described next.

Figure 19:
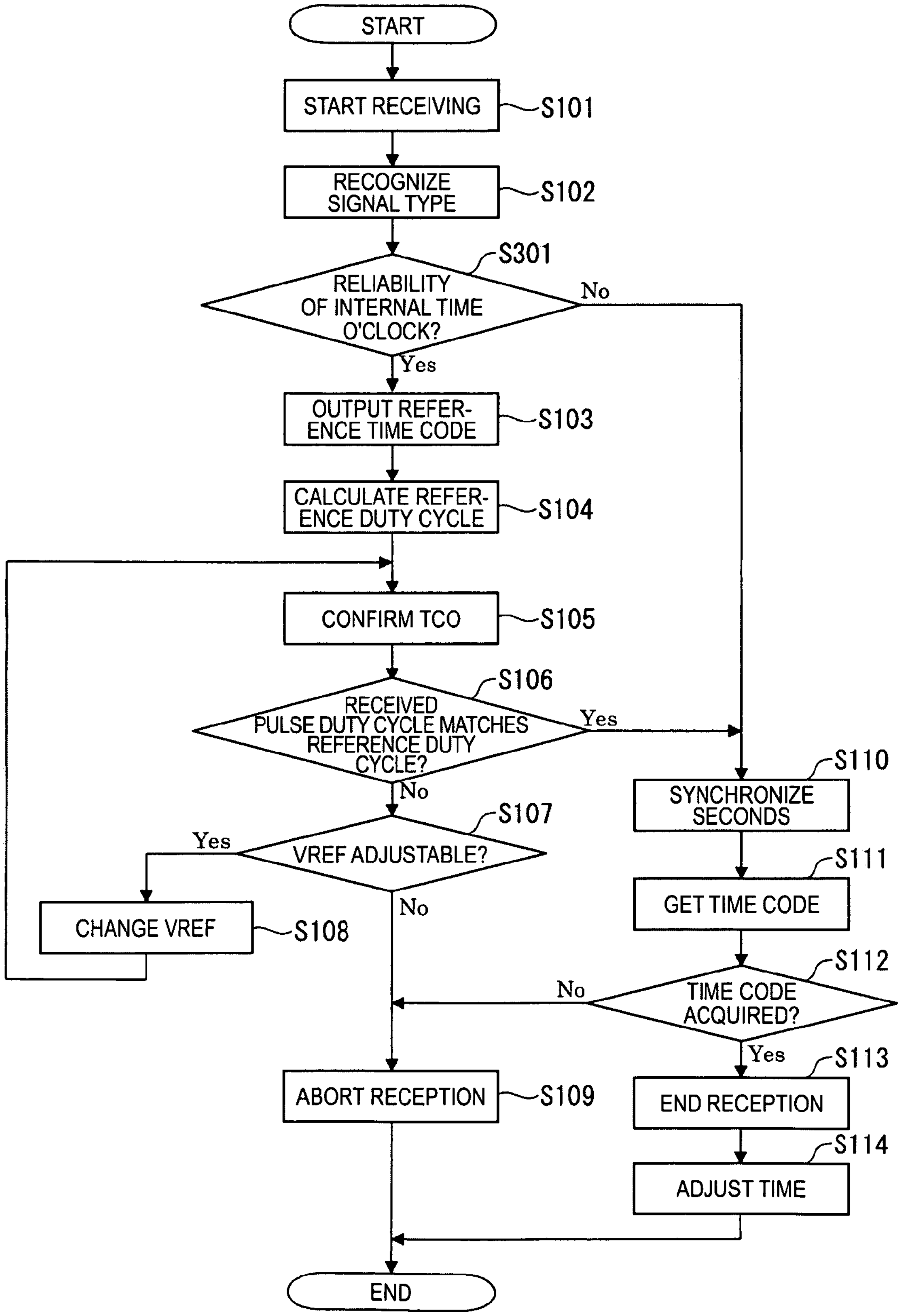
FIG. 19 is a flow chart describing the time adjustment operation of the radio-controlled timepiece according to the third embodiment of the invention.

FIG. 19 is a flow chart describing the time adjustment operation of the radio-controlled timepiece 1B.

As shown in FIG. 19 the time adjustment operation of the radio-controlled timepiece 1B according to this third embodiment of the invention first executes step S101 and step S102 in the same way as the radio-controlled timepiece 1 of the first embodiment. More specifically, if the preset time for automatically setting the time arrives or if input causing the time to be adjusted by receiving the time signal is asserted, the control unit 47 executes step S101, that is, starts the time adjustment process.

The control unit 47 then reads the signal type settings data in step S102.

The time code generator unit 44A of the radio-controlled timepiece 1B then determines the reliability of the internal time kept by the time counter 43 (step S301).

In step S301 the time code generator unit 44A references the time adjustment history stored in the storage unit 42 as described above and thus knows whether there is a history of adjusting the time, the method whereby the time adjustment operation was last invoked (whether the time was adjusted according to the standard time signal or whether the time was adjusted manually), and how much time has passed to the present since the last time the time was adjusted by receiving the standard time signal.

In this step the time code generator unit 44A determines that the reliability of the internal time is low if the time adjustment process based on reception of the standard time signal has not succeeded once since the internal time was reset and there is no record of adjusting the time in the time adjustment history, the time was adjusted manually the last time it was adjusted, or a prescribed time or longer has passed since the last time the time was set by receiving the standard time signal.

If the time code generator unit 44A decides in step S301 that the reliability of the internal time is high, step S103 is executed as in the radio-controlled timepiece 1 according to the first embodiment, and step S104 to step S114 are then executed as described in the first embodiment.

However, if the time code generator unit 44A decides in step S301 that the reliability of the internal time is low, step S110 to step S114 are executed as described in the first embodiment. More specifically, as in a common radio-controlled timepiece, the duty cycle of the pulses in the received standard time signal is not compared with the reference duty cycle, the time code is decoded from the TCO signal of the received standard time signal, the counts of the time counter 43 are set based on the time code, the internal clock is adjusted, and the time displayed on the display unit 5 is adjusted.

(3) Effect of the Radio-Controlled Timepiece 1B According to the Third Embodiment As described above, the time code generator unit 44A of the radio-controlled timepiece 1B according to the third embodiment of the invention also functions as an internal time reliability determination unit and determines the reliability of the internal time kept by the time counter 43. If the reliability of the internal time is high, the time code generator unit 44 generates the reference time code.

A reference time code that is wrong and differs from the actual current time due to a shift in the internal time is therefore not generated. The VREF switching circuit 38 therefore does not switch the reference voltage to a level based on the reference duty cycle of an inaccurate reference time code, and time adjustment errors caused by an inaccurate reference time code can be prevented. A high reliability reference time code and received pulse duty cycle can therefore be compared in step S106, and the VREF switching circuit 38 can output a more appropriate reference voltage to the A/D conversion circuit 37. A more accurate time adjustment process can therefore be applied based on a highly reliable reference time code.

If the reliability of the internal time is determined to be low in step S301, the reference voltage of the A/D conversion circuit 37 is not changed, a time adjustment process based on the standard time signal as known from the literature is applied, and the internal time of the time counter 43 is adjusted if a normal time code is successfully acquired from the standard time signal.

A reference time code based on the internal time can therefore be produced from the next time the standard time signal is received, and the time can be adjusted more accurately by adjusting the reception level based on the reference time code.

Other Embodiments

The invention is not limited to the embodiments described above, and various modifications and improvements achieving the object of the invention are included in the scope of the accompanying claims.

More specifically, the time code generator unit 44 in the embodiments described above generates a reference time code for the part of the time signal containing the hour and minute time information, but the invention is not so limited.

For example, the time counter 43 can be rendered with counters for counting the year, month, and date in addition to the hour, minute, and second, and the time code generator unit 44 can be rendered to generate a reference time code for one frame including the hour and minute of the current time, and calendar information including the number of days since January 1 of the current year, the year (the last two digits of the Gregorian calendar year), and the weekday.

The time code generator unit 44 could also generate a reference time code for the calendar information including the number of days since January 1 of the current year, the year, and the weekday, and the duty evaluation unit 45 could compare and evaluate the reference duty cycle of the reference time code based on the received pulse duty cycle for the calendar information part of the TCO signal.

When the user manually asserts a time adjustment command to start the time adjustment operation, and when the time adjustment process runs automatically at a preset time such as between 2:00 a.m. and 5:00 a.m., the time code generator unit 44 generates the reference time code every time the time adjustment process runs. However, a reference time code stored in the storage unit 42 could be used when the time adjustment process is executed at the preset time.

For example, when the time is adjusted for the first time at the preset reception time that is set at the factory and the first time the time is adjusted at the preset reception time after the preset reception time is set by the user, the time code generator unit 44 can output the reference time code based on the time data from the time counter 43 and the duty evaluation unit 45 can compare and evaluate the pulse duty cycle of the TCO signal with the generated reference time code. The time code generator unit 44 then stores the generated reference time code in the storage unit 42. The next time the time is adjusted at the preset reception time, the duty evaluation unit 45 compares and evaluates the pulse duty cycle of the received TCO signal with the reference duty cycle of the reference time code stored in the storage unit 42.

With this method the time code generator unit 44 does not need to generate the reference time code every time the time adjustment process runs at the preset reception time, the processing load on the time code generator unit 44 is therefore reduced, and the time adjustment process can be executed more quickly and with less power consumption.

The initial settings for the reference voltage VREF of the A/D conversion circuit 37 and the AGC characteristic of the AGC circuit 36A used during the reception process in the foregoing embodiments can be preset fixed values, or the settings used during one reception process can be stored in memory and used as the initial settings for the next reception process.

If the reception environment in which the reception process runs is constant, such as is usually the case at the preset reception time, and the settings used for the previous reception operation are used as the initial settings for the current operation, the likelihood is high that the received pulse duty cycle will match the initial reference duty cycle without changing the reference voltage or the AGC characteristic. The reception process can therefore be completely efficiently in less time.

The radio-controlled timepieces 1, 1A in the above embodiments are described using a straight reception method without a frequency conversion step, but the invention is not so limited and can also be applied to a radio-controlled timepiece having a superheterodyne reception circuit. The reception frequency can be switched in this case by changing the frequency division ratio or the output frequency of a VCO (voltage controlled oscillator) instead of switching a band-pass filter.

The reference voltage of the A/D conversion circuit 37 is changed in the foregoing first embodiment by unit of the VREF switching circuit 38 changing the reference voltage, but the invention is not so limited. For example, the reference voltage can be fixed and a circuit that changes the offset value of the comparator can be provided. Alternatively, the threshold value can be changed by providing a plurality of inverters to change the capacity of p-channel transistors and n-channel transistors.

The radio-controlled timepiece 1B according to the third embodiment of the invention adds the functionality of an internal time reliability determination unit to the time code generator unit 44 in the radio-controlled timepiece 1 according to the first embodiment, but the function of an internal time reliability determination unit can be added to the time code generator unit 44 of the radio-controlled timepiece 1A according to the second embodiment instead. This configuration affords the same effect as the radio-controlled timepiece 1B of the third embodiment, and enables a more highly reliable, accurate time adjustment process.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A radio-controlled timepiece that receives a standard time signal containing a time code and adjusts the time based on the received standard time signal, comprising:

a reception unit that receives the standard time signal;

an analog/digital conversion unit that digitizes the received standard time signal based on a prescribed threshold value;

a time counter that keeps time;

a time code generator that generates a reference time code based on the time counted by the time counter;

a duty evaluation unit that calculates the pulse duty cycle of the digital signal output from the A/D conversion unit, and determines if the received pulse duty cycle that is calculated matches the duty cycle of the reference time code generated by the time code generator;

a level changing unit that changes the relative level of the threshold value to the reception signal if the duty evaluation unit determines that the received pulse duty cycle does not match the duty cycle of the reference time code; and a time code decoder that decodes the digital signal and demodulates the time code if the duty evaluation unit determines that the received pulse duty cycle matches the duty cycle of the reference time code.

2. The radio-controlled timepiece described in claim 1, wherein:

the duty evaluation unit determines if the received pulse duty cycle is greater than or less than the duty cycle of the reference time code if the received pulse duty cycle does not match the duty cycle of the reference time code; and the level changing unit increases the level of the threshold value relative to the reception signal if the received pulse duty cycle is greater than the duty cycle of the reference time code, and decreases the level of the threshold value relative to the reception signal if the received pulse duty cycle is less than the duty cycle of the reference time code.

3. The radio-controlled timepiece described in claim 1, further comprising:

a threshold value adjustment unit that changes the threshold value of the A/D conversion unit;

wherein the level changing unit outputs a control signal to change the threshold value of the A/D conversion unit to the threshold value adjustment unit if the duty evaluation unit determines the received pulse duty cycle does not match the duty cycle of the reference time code; and the threshold value adjustment unit changes the threshold value level and changes the level of the threshold value relative to the reception signal according to the control signal.

4. The radio-controlled timepiece described in claim 3, further comprising:

a reception circuit unit including the reception unit, the A/D conversion unit, and the threshold value adjustment unit; and a control circuit unit including the time counter, the time code generator, the duty evaluation unit, the time code decoder, and the level changing unit, and controlling the standard time signal reception state of the reception circuit unit by outputting the control signal output from the level changing unit to the reception circuit unit;

wherein the reception circuit unit comprises a control signal decoding unit that decodes the control signal output from the level changing unit of the control circuit unit, and outputs the decoded control signal to the threshold value adjustment unit.

5. The radio-controlled timepiece described in claim 4, further comprising:

a serial communication bus that connects the reception circuit unit and the control circuit unit;

wherein the control circuit unit serially outputs the control signal to the reception circuit unit through the serial communication bus; and the reception circuit unit serially receives the control signal through the serial communication line and decodes the received control signal by unit of the control signal decoding unit.

6. The radio-controlled timepiece described in claim 4, wherein:

the level changing unit does not change the threshold value and holds the level of the threshold value relative to the reception signal constant until the reception operation ends after the duty evaluation unit determines after the reception operation starts that the received pulse duty cycle matches the duty cycle of the reference time code.

7. The radio-controlled timepiece described in claim 1, further comprising:

an amplification unit that amplifies the received standard time signal; and an amplification adjustment unit that changes the reception signal amplification factor of the amplification unit;

wherein the level changing unit outputs a control signal to change the signal amplification factor of the amplification unit to the amplification adjustment unit if the duty evaluation unit determines the received pulse duty cycle does not match the duty cycle of the reference time code; and the amplification adjustment unit changes the signal amplification factor of the amplification unit and changes the level of the threshold value relative to the reception signal according to the control signal.

8. The radio-controlled timepiece described in claim 4, further comprising:

a reception circuit unit including the amplification unit, the amplification adjustment unit, and the A/D conversion unit; and a control circuit unit including the time counter, the time code generator, the duty evaluation unit, the time code decoder, and the level changing unit, and controlling the standard time signal reception state of the reception circuit unit by outputting the control signal output from the level changing unit to the reception circuit unit;

wherein the reception circuit unit comprises a control signal decoding unit that decodes the control signal output from the level changing unit of the control circuit unit, and outputs the decoded control signal to the amplification adjustment unit.

9. The radio-controlled timepiece described in claim 1, wherein:

the level changing unit stores the relative level of the threshold value to the reception signal that is set during the reception operation for each type of standard time signal received, and sets the stored level of the threshold value relative to the reception signal as the initial value used when the time signal is next received.

10. The radio-controlled timepiece described in claim 1, wherein:

the reception unit can selectively receive a plurality of standard time signal types;

the radio-controlled timepiece further comprises a reception signal setting unit that selects the type of standard time signal received by the reception unit;

the time code generator generates a time code corresponding to the type of standard time signal selected by the reception signal setting unit; and the duty evaluation unit compares and evaluates the duty cycle of the reference time code corresponding to the type of standard time signal selected by the reception signal setting unit with the received pulse duty cycle of the digitized signal.

11. The radio-controlled timepiece described in claim 1, further comprising:

an internal time reliability determination unit that determines the reliability of the time kept by the time counter;

wherein the time code generator generates the reference time code when the time counted by the time counter is determined reliable by the internal time reliability determination unit.

12. A control method for a radio-controlled timepiece that receives a standard time signal containing a time code and adjusts the time based on the received standard time signal, the control method comprising steps of:

receiving the standard time signal;

digitizing and outputting the received standard time signal based on a prescribed threshold value;

generating a reference time code based on a time counted by a time counter;

calculating the pulse duty cycle of the digital signal, and determining if the calculated pulse duty of the digital signal matches the duty cycle of the generated reference time code;

changing the relative level of the threshold value to the reception signal if the received pulse duty cycle does not match the duty cycle of the reference time code, and repeating this level changing step until the received pulse duty cycle matches the duty cycle of the reference time code; and decoding the digital signal and demodulating the time code when the received pulse duty cycle matches the duty cycle of the reference time code.

* * * * *